United States Patent
O'Brien, III et al.

(10) Patent No.: US 11,829,493 B2
(45) Date of Patent: *Nov. 28, 2023

(54) DEVICE ACCESS CONTROL SYSTEM

(71) Applicant: Dell Products L.P., Round Rock, TX (US)

(72) Inventors: Walter A O'Brien, III, Westborough, MA (US); Mukund P. Khatri, Austin, TX (US); Jimmy D. Pike, Georgetown, TX (US); Mark Steven Sanders, Roanoke, VA (US); Elie Jreij, Pflugerville, TX (US); Gaurav Chawla, Austin, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 326 days.

This patent is subject to a terminal disclaimer.

(21) Appl. No.: 17/221,319

(22) Filed: Apr. 2, 2021

(65) Prior Publication Data

US 2022/0129571 A1    Apr. 28, 2022

Related U.S. Application Data

(63) Continuation-in-part of application No. 17/081,808, filed on Oct. 27, 2020, now Pat. No. 11,537,705.

(51) Int. Cl.
G06F 21/62 (2013.01)

(52) U.S. Cl.
CPC .................. *G06F 21/62* (2013.01)

(58) Field of Classification Search
CPC .. G06F 21/44; G06F 21/572; G06F 2221/034; G06F 21/62; H04L 63/101; H04L 67/34
See application file for complete search history.

(56) References Cited

U.S. PATENT DOCUMENTS 7,376,944 B2 * 5/2008 Crisan ..................... G06F 8/65
                                            714/36
9,112,866 B2 * 8/2015 Carrara .................. H04L 63/10
(Continued)

FOREIGN PATENT DOCUMENTS

AU    2020200073 B2 *  7/2021  ............ H04L 63/10
CN    105653347  A  *  6/2016
(Continued)

*Primary Examiner* — Shahriar Zarrineh
(74) *Attorney, Agent, or Firm* — Joseph Mencher

(57) ABSTRACT

A device access control system includes a computing system having a device access controller subsystem coupled to devices and a central processing subsystem. A device access control manager subsystem is coupled to the device access controller subsystem and operates, during initialization operations for the computing system, to identify application(s) that are configured to be provided by the central processing subsystem, and identify a first subset of the devices that satisfy application provisioning requirements for the application(s). The device access control management subsystem then configures the device access controller subsystem to provide the central processing subsystem access to the first subset of the devices in order to allow the central processing subsystem to provide the application(s), and disable access for the central processing subsystem to a second subset of the devices in order to prevent the central processing subsystem from using the second subset of the devices to provide the application(s).

20 Claims, 31 Drawing Sheets

(56) References Cited

U.S. PATENT DOCUMENTS

| | | | | |
|---|---|---|---|---|
| 9,146,721 | B1* | 9/2015 | Nagaraja | G06F 8/61 |
| 9,367,978 | B2* | 6/2016 | Sullivan | G07C 9/00571 |
| 9,426,203 | B2* | 8/2016 | Heeter | H04M 1/72415 |
| 9,749,333 | B2* | 8/2017 | Lloyd | H04L 67/306 |
| 9,870,238 | B2* | 1/2018 | Astete | H04L 63/10 |
| 10,037,424 | B1* | 7/2018 | Guenther | G06F 9/50 |
| 10,771,472 | B2* | 9/2020 | Copsey | G06F 21/6218 |
| 11,108,828 | B1* | 8/2021 | Curtis | H04L 63/20 |
| 2005/0091522 | A1* | 4/2005 | Hearn | G06F 21/575 |
| | | | | 726/26 |
| 2007/0260702 | A1* | 11/2007 | Richardson | G06F 16/95 |
| | | | | 709/217 |
| 2009/0125901 | A1* | 5/2009 | Swanson | G06F 9/45558 |
| | | | | 718/1 |
| 2011/0154320 | A1* | 6/2011 | Verma | H04W 4/60 |
| | | | | 718/1 |
| 2012/0096521 | A1* | 4/2012 | Peddada | H04L 41/28 |
| | | | | 726/4 |
| 2012/0215941 | A1* | 8/2012 | Brownlow | G06F 13/385 |
| | | | | 710/3 |
| 2013/0013738 | A1* | 1/2013 | Astete | G06F 21/6218 |
| | | | | 709/217 |
| 2013/0132944 | A1* | 5/2013 | Davis | G06F 9/468 |
| | | | | 718/1 |
| 2013/0227563 | A1* | 8/2013 | McGrath | G06F 8/60 |
| | | | | 718/1 |
| 2014/0075432 | A1* | 3/2014 | McGrath | G06F 9/455 |
| | | | | 718/1 |
| 2014/0157058 | A1* | 6/2014 | Bennah | G06F 11/3604 |
| | | | | 714/38.1 |
| 2014/0208097 | A1* | 7/2014 | Brandwine | G06F 21/33 |
| | | | | 713/164 |
| 2014/0297751 | A1* | 10/2014 | Antani | G06F 9/468 |
| | | | | 709/204 |
| 2016/0066140 | A1* | 3/2016 | Gnanasekaran | G06Q 30/0207 |
| | | | | 455/456.3 |
| 2016/0087956 | A1* | 3/2016 | Maheshwari | H04W 4/08 |
| | | | | 726/6 |
| 2017/0257362 | A1* | 9/2017 | Maheshwari | H04L 63/104 |
| 2018/0293374 | A1* | 10/2018 | Chen | G06F 9/45558 |
| 2019/0121965 | A1* | 4/2019 | Chai | G06F 21/56 |
| 2019/0124090 | A1* | 4/2019 | Copsey | H04L 63/0876 |
| 2019/0250939 | A1* | 8/2019 | Salli | G06F 9/45558 |
| 2019/0327135 | A1* | 10/2019 | Johnson | H04L 67/34 |
| 2020/0092332 | A1* | 3/2020 | Bhattathiri | G06F 21/53 |
| 2020/0186445 | A1* | 6/2020 | Govindaraju | H04L 67/34 |
| 2020/0186534 | A1* | 6/2020 | Chanda | H04L 63/0815 |

FOREIGN PATENT DOCUMENTS

| | | | | |
|---|---|---|---|---|
| CN | 109766110 A | * | 5/2019 | |
| EP | 2397943 A2 | * | 12/2011 | G06F 9/45558 |
| EP | 3361425 A1 | * | 8/2018 | G06F 17/211 |
| JP | 2006518500 A | * | 8/2006 | G06F 17/211 |
| JP | 2014514659 A | * | 6/2014 | |
| WO | WO-2013025196 A1 | * | 2/2013 | G06F 21/74 |

* cited by examiner

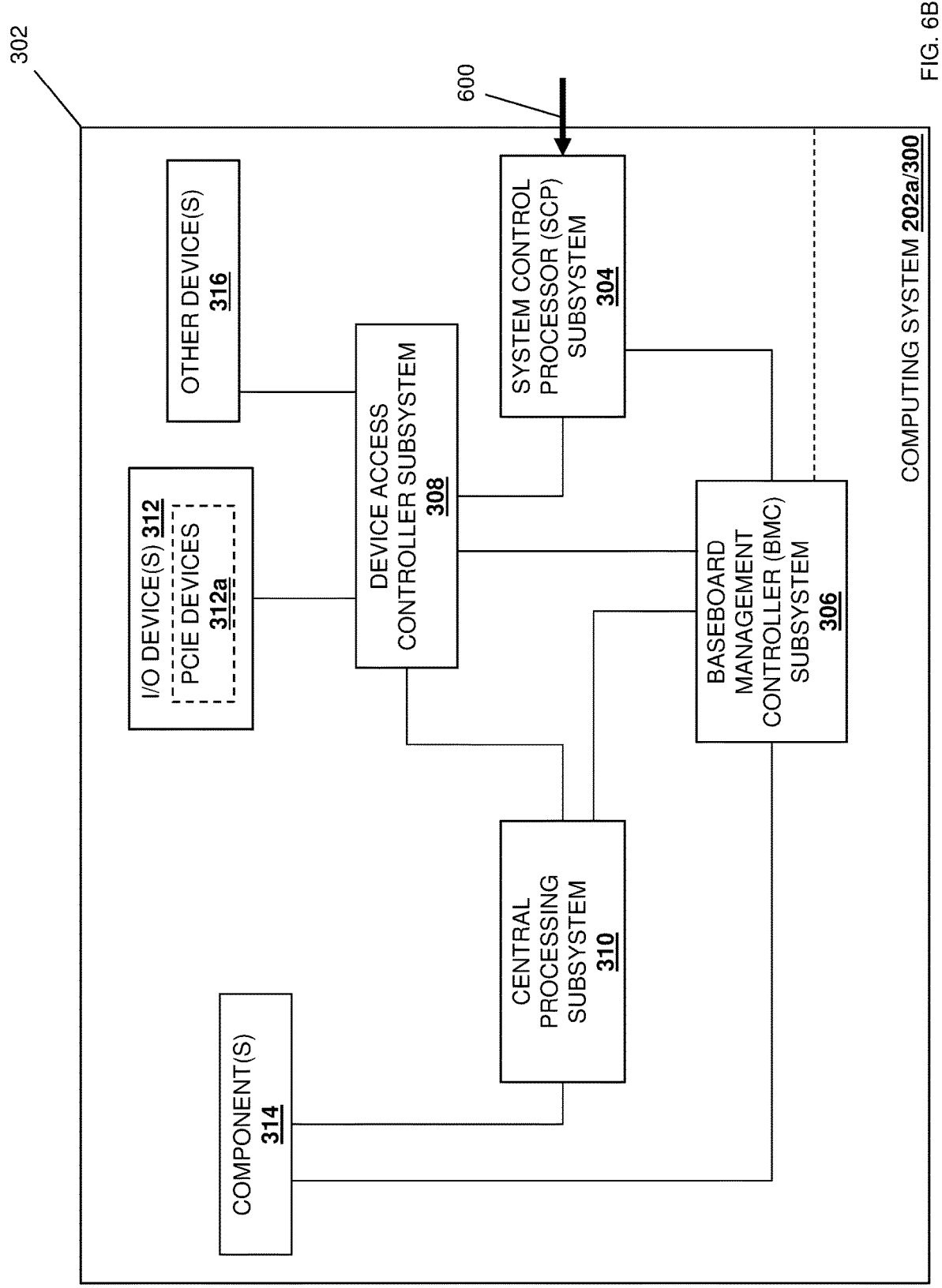

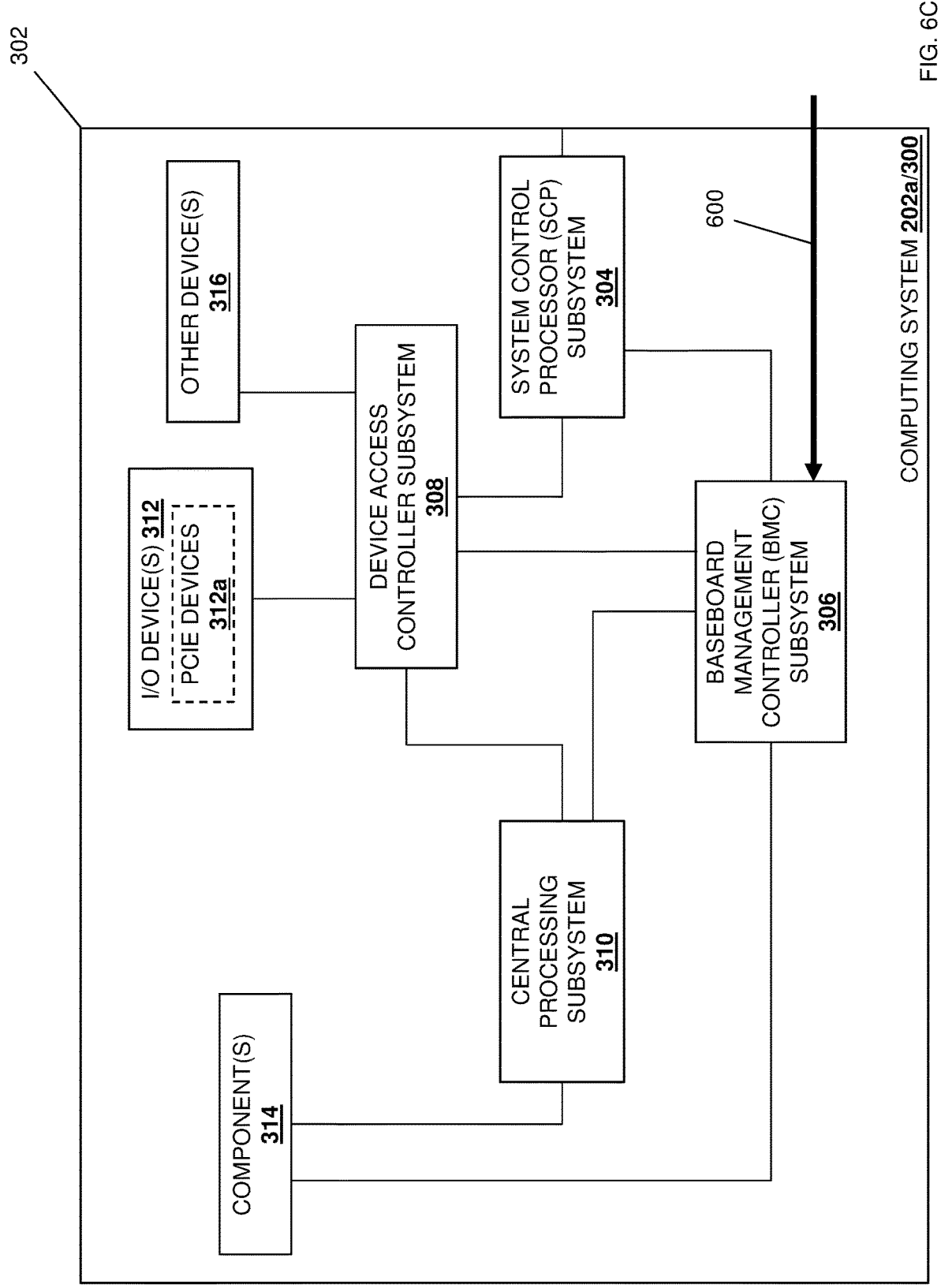

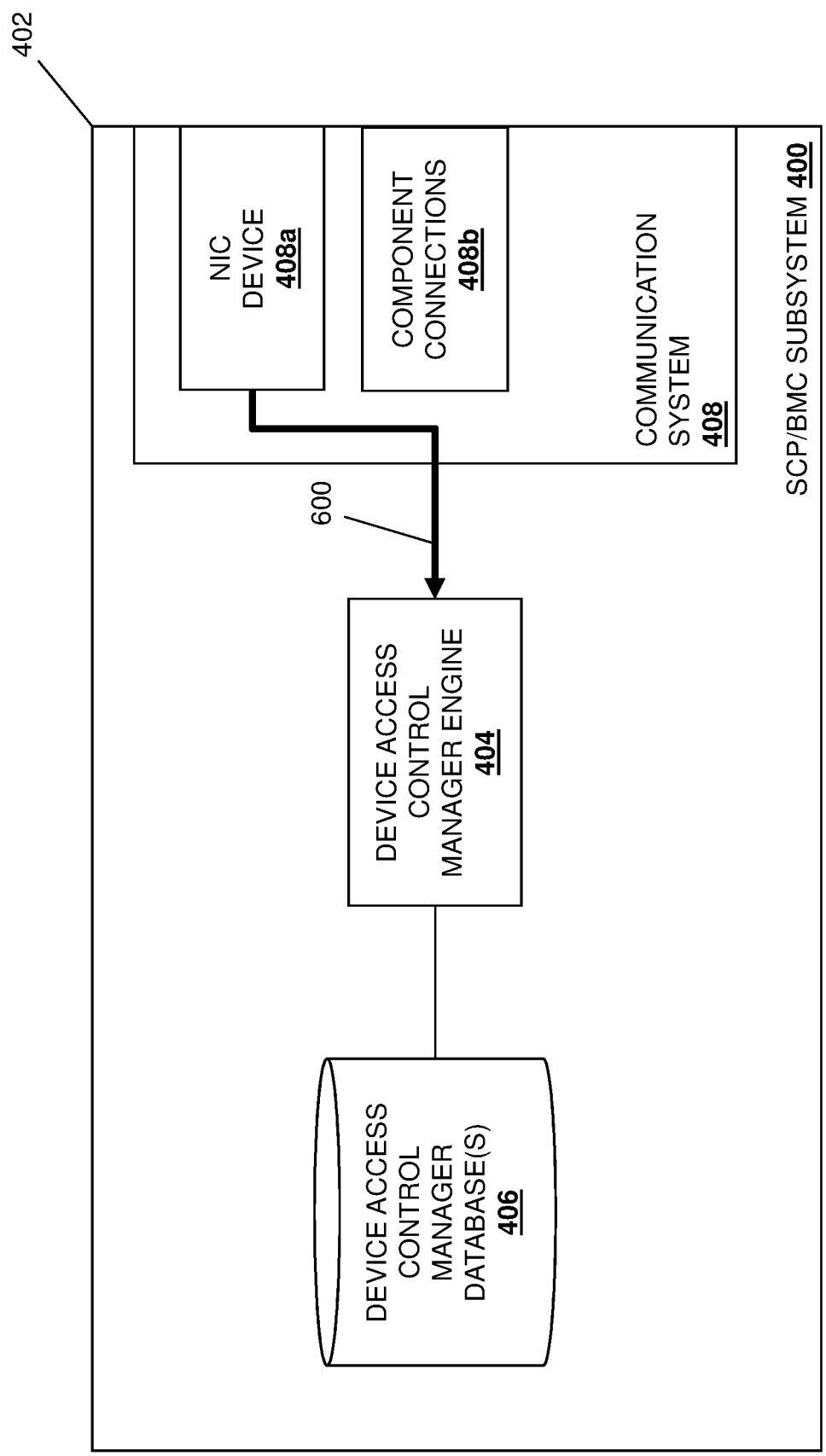

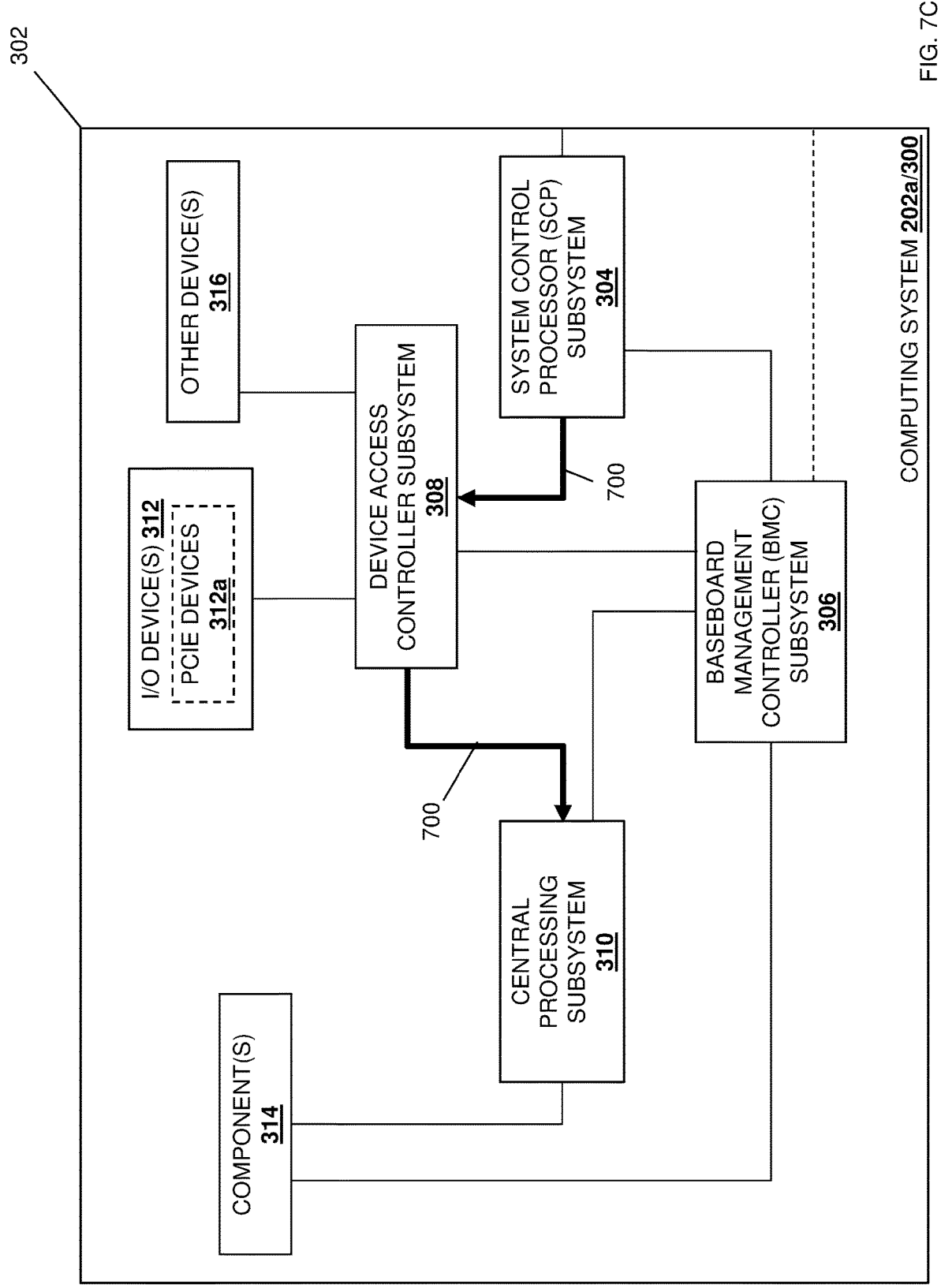

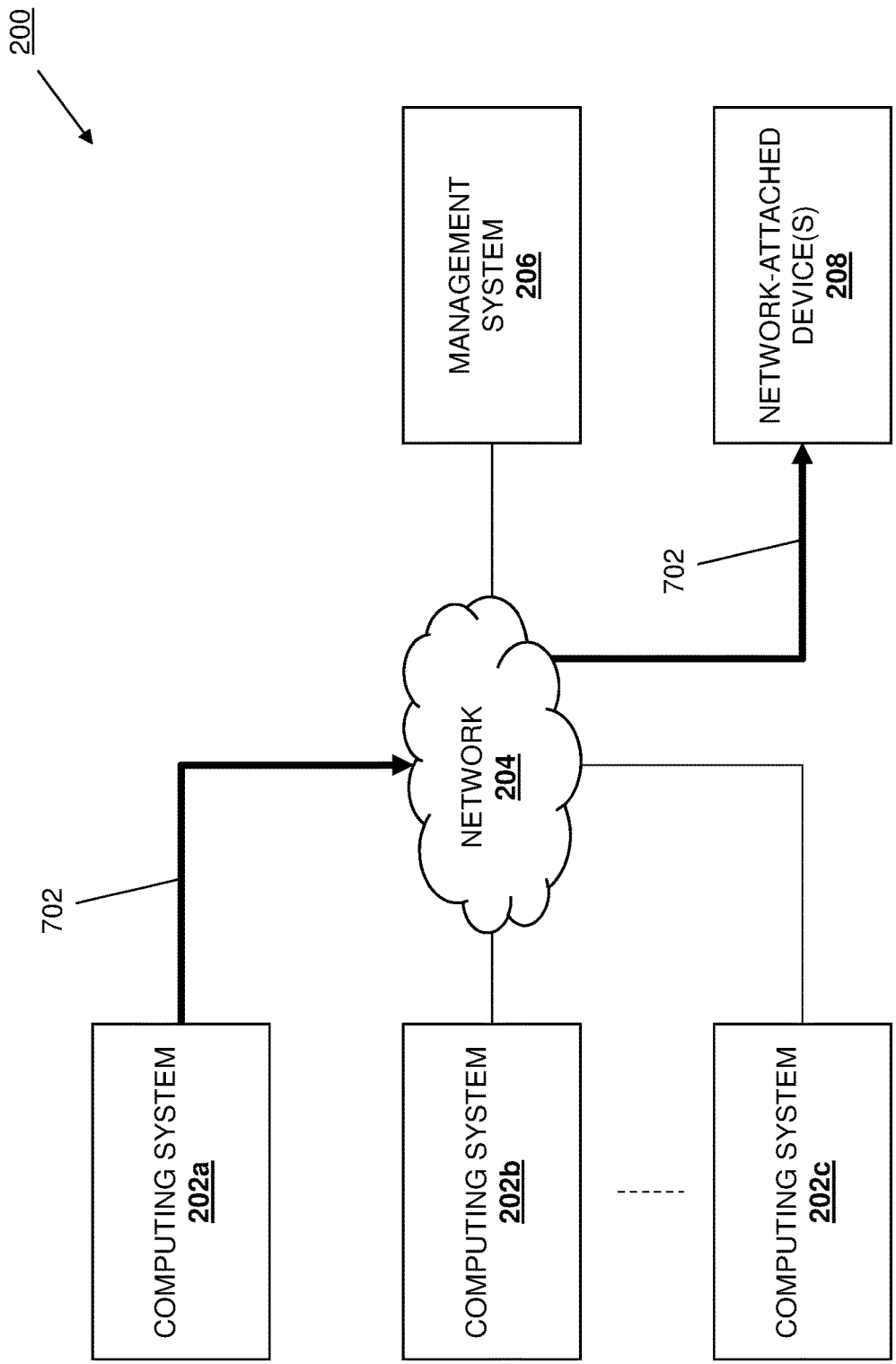

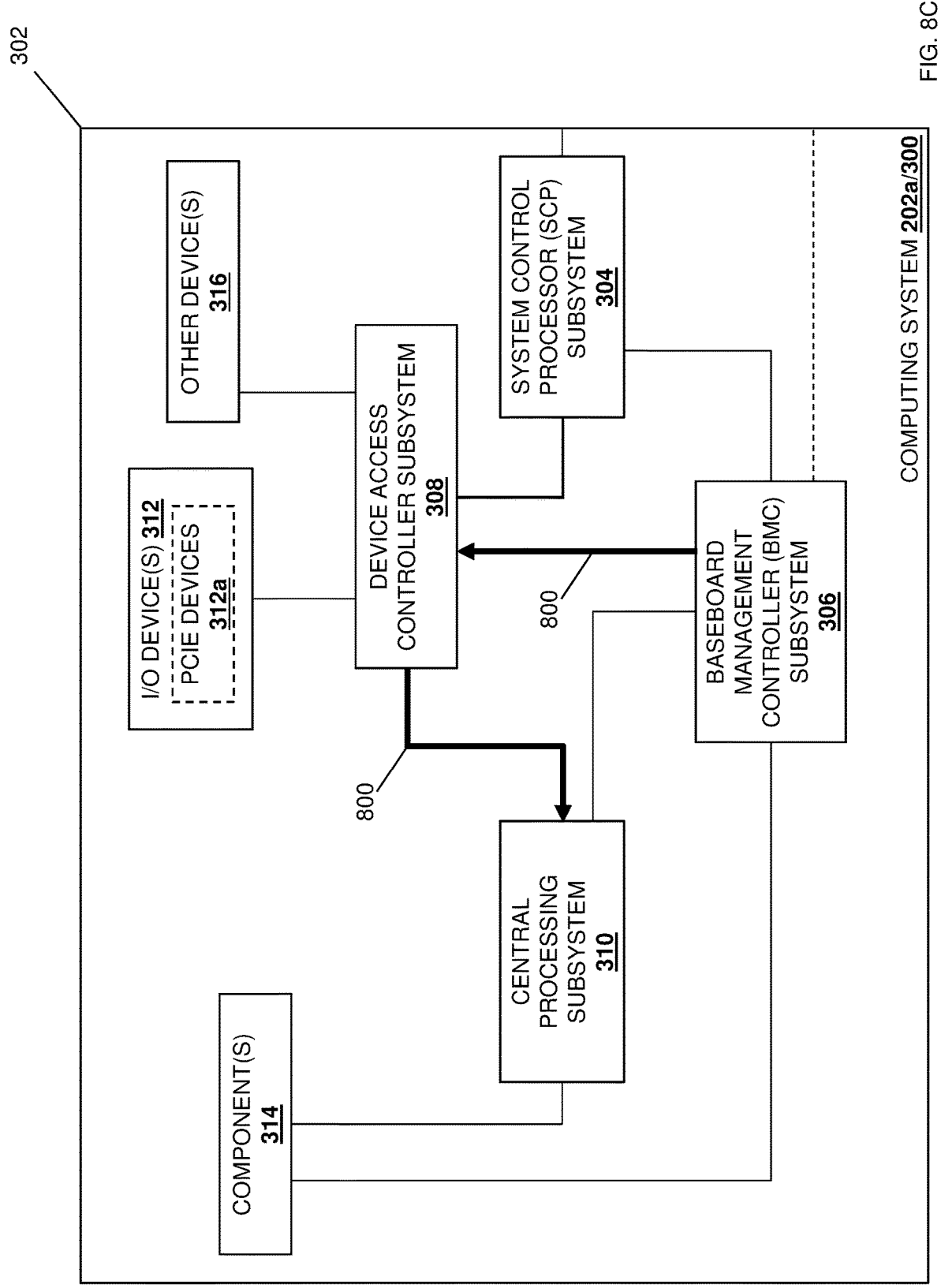

DEVICE ACCESS CONTROL SYSTEM

CROSS-REFERENCE TO RELATED APPLICATIONS

The present application is a continuation-in-part of U.S. patent application Ser. No. 17/081,808, filed on Oct. 27, 2020, the disclosure of which is incorporated by reference herein in its entirety.

BACKGROUND

The present disclosure relates generally to information handling systems, and more particularly controlling access to devices and/or device functionality in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers and/or other computing systems known in the art, may include devices and/or other server hardware that is configurable for use locally (e.g., by a central processing subsystem in that server) or remotely (e.g., by a central processing system in another server via a network) in order to provide applications, workloads, and/or other services known in the art. For example, conventional composable systems may allow a network administrator or other user to select a server with devices and/or other server hardware that best "matches" the requirements of the applications, workloads, and/or other services that are going to be provided, and then configure that server and its devices/server hardware to provide the applications, workloads, and/or other services. However, conventional composable systems operate to dedicate any particular server and its devices/server hardware to the applications, workloads, and/or other services that are being provided by that server, which can raise some issues.

For example, conventional composable systems may provide applications, workloads, and/or other services on a server that includes devices/server hardware that is not capable of providing optimal operations for the applications, workloads, and/or other services, or may provide those applications, workloads, and/or other services on a server that includes devices/server hardware that is overly capable of providing optimal operations for the applications, workloads, and/or other services. As such, conventional composable systems may provide sub-optimal operations for applications, workloads, and/or other services, or may provide for inefficient use of the devices/server hardware in the server providing those applications, workloads, and/or other services (i.e., devices in the conventional composable system that are not used by a local CPU may "go to waste").

Furthermore, application(s) provided on a conventional composable system may be "confused" by devices that are included in that composable system but that the application was not expecting to have access to, which may result in that composable system not being configured to provide that application. For example, if an operating system application is provided in a conventional composable system and has access to multiple Network Interface Controller (NIC) devices but is only expecting to have access to a single NIC device, that operating system application may not be able to determine which of the NIC devices to utilize for network communication, which may prevent the operating system application from being provided on that composable system, or may limit the functionality of that operating system application provided on that composable system. In another example, some applications may be designed to operate with specifically configured systems, and if such an application is provided on a conventional composable system that cannot be configured in the manner that the application has been designed for, that application may determine that the composable system upon which it is provided is not supported, which may prevent operation (or desired functionality) from that application.

Further still, in "as-a-service" environments, application(s) provided on a conventional composable system may have access to devices that are included in that composable system but that the user of that application has not paid to utilized. Similarly, the utilization of some devices or their device functionality on conventional composable systems may require the payment of licensing fees, and users of applications provided on those composable systems may wish to avoid paying those licensing fees. For example, the use of processor cores, particular processing frequencies, and/or processor hardware accelerators may cause the user of the corresponding processing system to be subject to licensing fees. Yet further still, application(s) provided on a conventional composable system may have access to devices or device functionality that may create security issues. For example, an application on a composable system may have access to Universal Serial Bus (USB) connectors and/or wireless communication devices included with the composable system, which may present security issues because they allow data to be copied from the conventional composable system. In another example, it may be desirable to only allow applications to interact with devices utilizing validated firmware, or to prevent applications from accessing memory devices or storage devices (or regions of those memory devices or storage devices) that have been used to store data for other users.

Accordingly, it would be desirable to provide a composable system that addresses the issues discussed above.

SUMMARY

According to one embodiment, an Information Handling System (HIS) may include a secondary processing subsystem; and a secondary memory subsystem that is coupled to the secondary processing subsystem and that includes instructions that, when executed by the secondary processing subsystem, cause the secondary processing subsystem to provide a device access control manager engine that is configured, during initialization operations for a first computing system that includes the IHS, to: identify at least one first application that is configured to be provided by a central processing subsystem that is included in a first computing system; identify a first subset of a plurality of first devices in the first computing system that satisfy first application provisioning requirements for the at least one first application; configure a device access controller subsystem in the first computing system to provide the central processing subsystem access to the first subset of the plurality of first devices in order to allow the central processing subsystem to provide the at least one first application; and configure the device access controller subsystem in the first computing system to disable access for the central processing subsystem to a second subset of the plurality of first devices in the first computing system in order to prevent the central processing subsystem from using the second subset of the plurality of first devices to provide the at least one first application.

BRIEF DESCRIPTION OF THE DRAWINGS

FIG. 6B is a schematic view illustrating an embodiment of the computing system of FIG. 3 operating during the method of FIG. 5.

FIG. 6C is a schematic view illustrating an embodiment of the computing system of FIG. 3 operating during the method of FIG. 5.

FIG. 6E is a schematic view illustrating an embodiment of the SCP subsystem of FIG. 4 operating during the method of FIG. 5.

FIG. 7C is a schematic view illustrating an embodiment of the computing system of FIG. 3 operating during the method of FIG. 5.

FIG. 7H is a schematic view illustrating an embodiment of the networked system of FIG. 2 operating during the method of FIG. 5.

FIG. 8C is a schematic view illustrating an embodiment of the computing system of FIG. 3 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage devices (e.g., disk drives such as Hard Disk Drives (HDDs), Solid State Drives (SSDs), and/or other storage devices known in the art), one or more network ports for communicating with external devices as well as various input and output (I/O) devices, such as a keyboard, a mouse, a touchscreen and/or a video display, large SSDs, Graphics Processing Units (GPUs), Tensor Processing Units (TPUs), Field Programmable Gate Arrays (FPGAs), and/or other I/O devices known in the art. The information handling system may also include one or more buses operable to transmit communications between the various hardware components.

Figure 1:
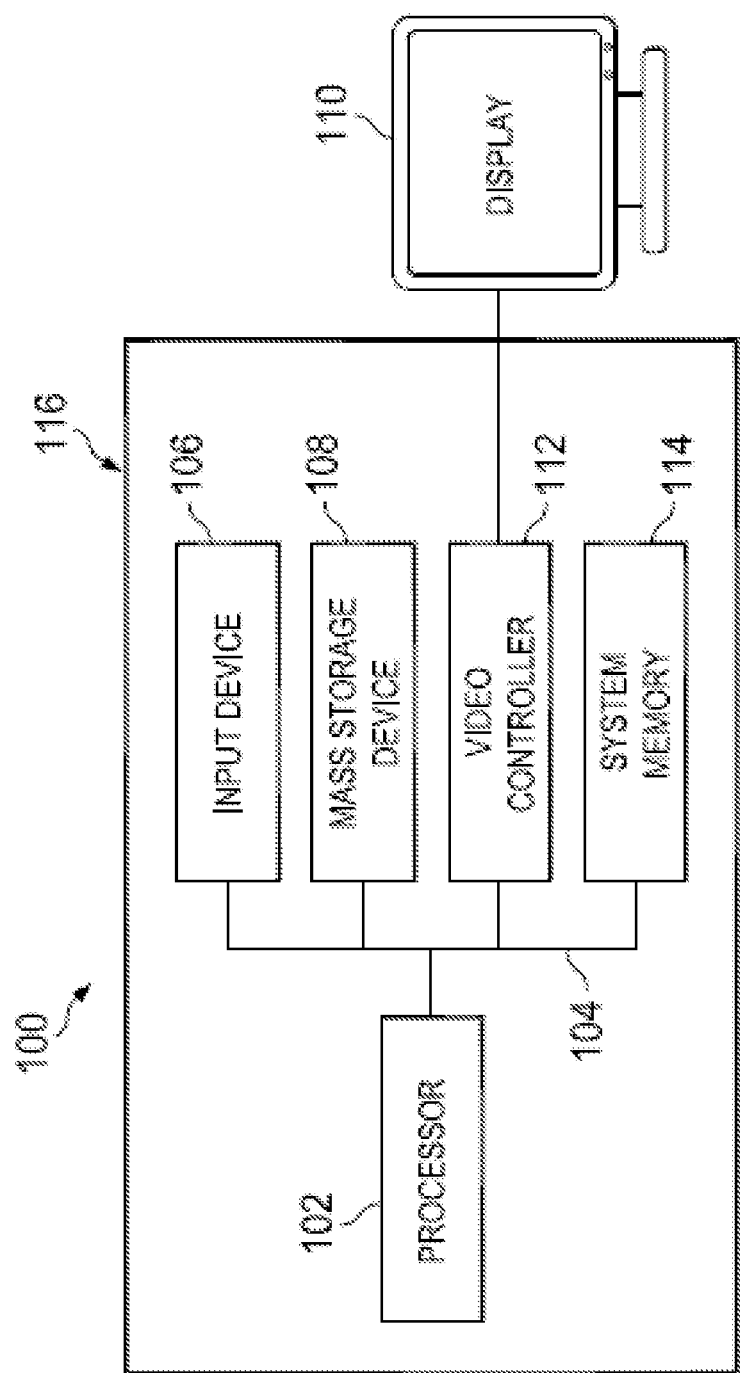
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
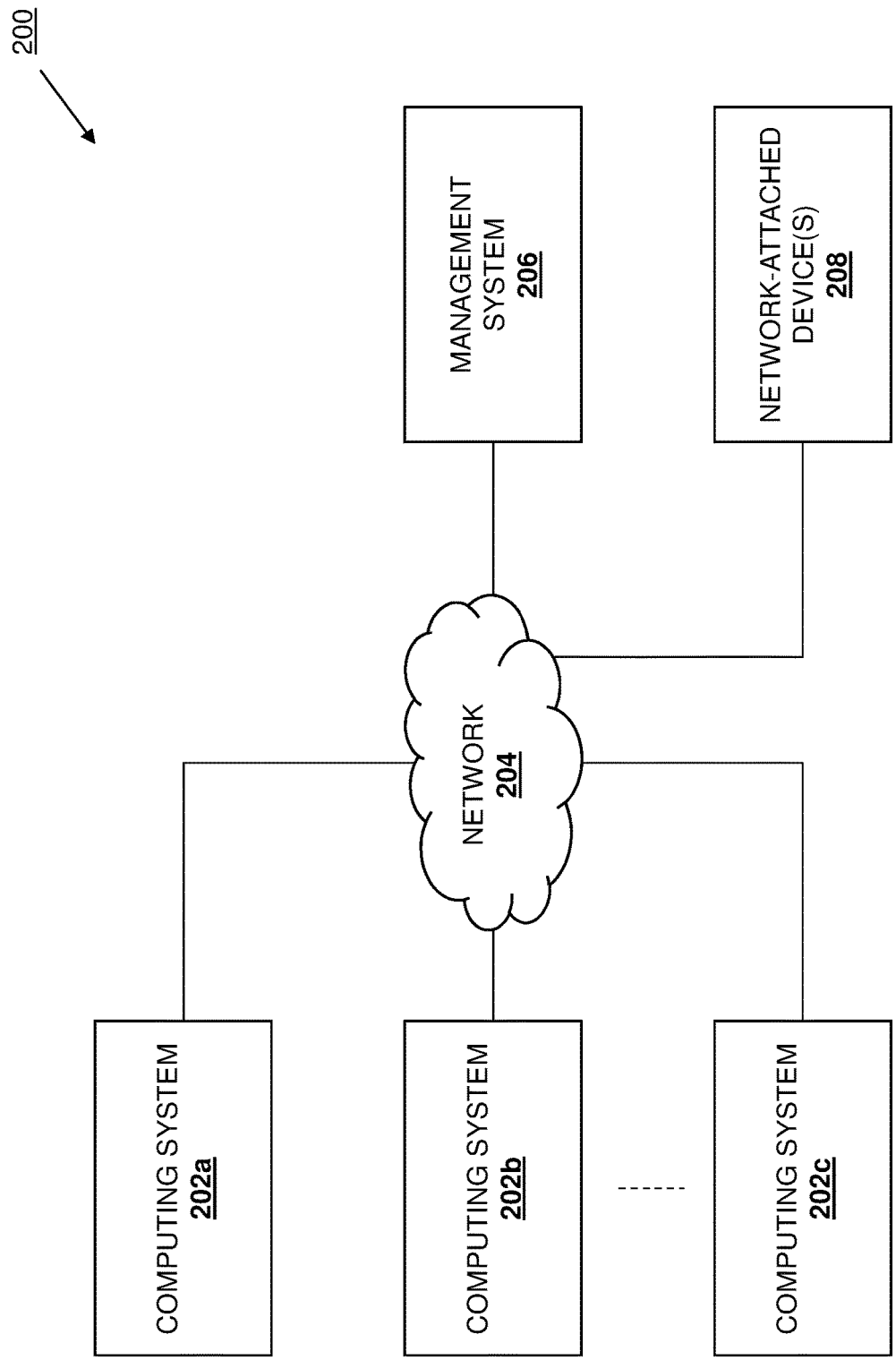
FIG. 2 is a schematic view illustrating an embodiment of a networked system.

Referring now to FIG. 2, an embodiment of a networked system 200 is illustrated in which the device access control system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure. In some examples, the network 204 may include a first network for management data traffic and a second network for other data traffic, while in other examples, the network 204 may provide for both the management data traffic and other data traffic.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c. In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples below are discussed as being provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the device access control system of the present disclosure may be utilized with a variety of components and component configurations, and/or may be provided in a variety of computing system/network configurations, while remaining within the scope of the present disclosure as well.

Figure 3:
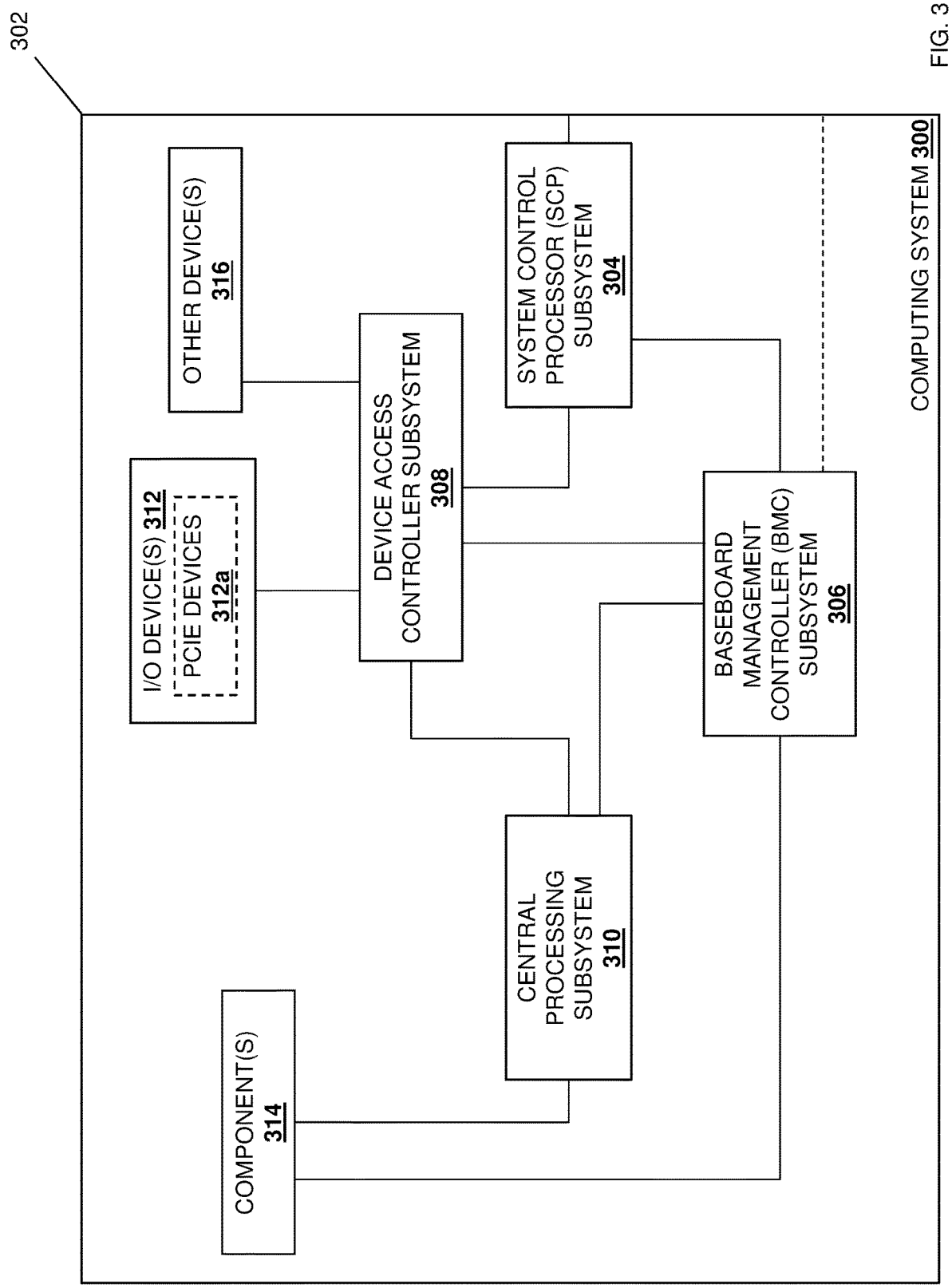
FIG. 3 is a schematic view illustrating an embodiment of a computing system that may be included in the networked system of FIG. 2 and that may utilize the device access control functionality of the present disclosure.

Referring now to FIG. 3, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated and discussed below.

For example, the chassis 302 may house a device access control manager subsystem that, in the embodiments illustrated and discussed below, may be provided by a System Control Processor (SCP) subsystem 304 and/or a Baseboard Management Controller (BMC) subsystem 306 that are provided according to the teachings of the present disclosure to perform the device access control manager functionality that is discussed in further detail below. In one specific example discussed below, the device access control manager subsystem may be provided by the BMC subsystem 306 (e.g., with the SCP subsystem 304 omitted) that operates to provide local device access management. In another specific example discussed below, the device access control manager subsystem may be provided by both the SCP subsystem 304 and the BMC subsystem 306, with the SCP subsystem 304 providing a single device management entry point for its computing system 300, and communicating with the BMC subsystem 306 to provide for local device access management. In yet another specific example, discussed below, the device access control manager subsystem may be provided by both the SCP subsystem 304 and the BMC subsystem 306, with the SCP subsystem 304 providing for both local and remote device access management. However, while several specific examples are described, one of skill in the art in possession of the present disclosure will appreciate that the functionality described below may be provided in other manners (e.g., by a combined SCP/BMC subsystem) while remaining within the scope of the present disclosure as well.

In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, the disclosure of which is incorporated herein by reference in its entirety. However, while the device access control manager subsystem that enables the expanded availability functionality according to the teachings of the present disclosure is illustrated and described as an enhanced SmartNIC device provided by an SCP subsystem, one of skill in the art in possession of the present disclosure will appreciate that the device access control functionality described herein may be enabled on otherwise conventional SmartNIC devices, or via NIC devices (along with other components that enable the expanded availability functionality discussed below) while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

In an embodiment, the chassis 302 may also house the Baseboard Management Controller (BMC) subsystem 306 that is coupled to the SCP subsystem 304, and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure. As such, the BMC subsystem 310 may be configured to utilize a dedicated management network connection (e.g., illustrated by the dashed line in FIG. 3), or may be configured to utilize a network connection included in the SCP subsystem 304 (e.g., via a Network Communications Services Interface (NCSI) that allows the use of a NIC port on a NIC device in the SCP subsystem 304).

The chassis 302 may also house a device access controller subsystem 308 that is coupled to the SCP subsystem 304 and the BMC subsystem 306. In the embodiments illustrated and discussed below, the device access controller subsystem 308 is provided by a fabric switch device. However, in other specific examples, the device access controller subsystem 308 may be provided by a Peripheral Component Interconnect express (PCIe) switch device, a Compute Express Link (CxL) switch device, a Gen-Z switch device, and/or other switch devices, and/or may include components such as protocol bridges and/or other combinations of element between a processing system and the devices which support the device access control capabilities of the present disclosure. As such, the device access controller subsystem 308 may be provided by the IHS 100 discussed above with reference to FIG. 1 and/or may include some or all of the components of the IHS 100 that are configured to perform the switching functionality and/or application control communication transmission discussed in further detail below.

The chassis 302 may also house a central processing system 310 that is coupled to the SCP subsystem 304 via the device access controller subsystem 306, coupled directly to the BMC subsystem 306, and which may include the processor 102 discussed above with reference to FIG. 1, a Central Processing Unit (CPU) such as a x86 host processor, and/or by a variety of other processing components that would be apparent to one of skill in the art in possession of the present disclosure. As discussed below, the central processing system 310 may include one or more processor sockets (e.g., the CPU sockets) that are configured to connect to processors that provide the central processing system 310, one or more processor cores in each processor that provides the central processing system 310, processing system hardware accelerator device(s), and/or any other central processing system components that would be apparent to one of skill in the art in possession of the present disclosure.

The chassis 302 may also house (or provide a coupling for) one or more Input/Output (I/O) devices 312 that are coupled to the SCP subsystem 304, the central processing system 310, and the BMC subsystem 306 via the device access controller subsystem 308. As such, one of skill in the art in possession of the present disclosure will recognize that the I/O device(s) 312 may be housed in the chassis 302 and connected to an internal connector (e.g., on a motherboard in the chassis 302) that is coupled to the device access controller subsystem 308, or may be provided external to the chassis 302 and connected to an external connector (e.g., on an outer surface the chassis 302) that is coupled to the device access controller subsystem 308. As illustrated in FIG. 3, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices (e.g., a SAS controller) will fall within the scope of the present disclosure as well. The chassis 302 may also house one or more components 314 that are coupled to the central processing system 310 and the BMC subsystem 306.

The chassis 302 may also house one or more other devices 316 that are coupled to the SCP subsystem 304, the central processing system 310, and the BMC subsystem 306 via the device access controller subsystem 308, and the other device(s) 316 may include any devices utilized in the performance of applications such as, for example, GPUs, TPUs, FPGAs, and/or other devices known in the art. As will be appreciated by one of skill in the art in possession of the present disclosure, any of the network-attached device(s) 208, the central processing subsystem 310, the I/O device(s) 312, the PCIe devices 312a, the components 314, and/or the other device(s) 316 described above may be configurable to provide varying types/levels of corresponding device functionality. For example, CPUs providing the central processing system 310 discussed above may include multiple cores, any of which may be enabled or disabled to provide different types/levels of CPU functionality. In another example, the CPUs providing the central processing system 310 discussed above may be configurable to operate at different processing frequencies, any of which may be enabled or disabled to provide different types/levels of CPU functionality. In yet another example, the CPUs providing the central processing system 310 discussed above may include hardware accelerator device(s), any of which may be enabled or disabled to provide different types/levels of CPU functionality. However, while examples of different device functionality for CPUs are described above, one of skill in the art in possession of the present disclosure will appreciate that the other devices and/or components discussed herein may be configurable with differing device/component functionality while remaining within the scope of the present disclosure as well.

As such, while a specific computing system 300 has been illustrated and described, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, in some embodiments, the BMC subsystem 306 described above with reference to FIG. 3 may be omitted, and the SCP subsystem 304 may be configured to provide a BMC subsystem that performs the functionality of the BMC subsystem 306 in FIG. 3.

Figure 4:
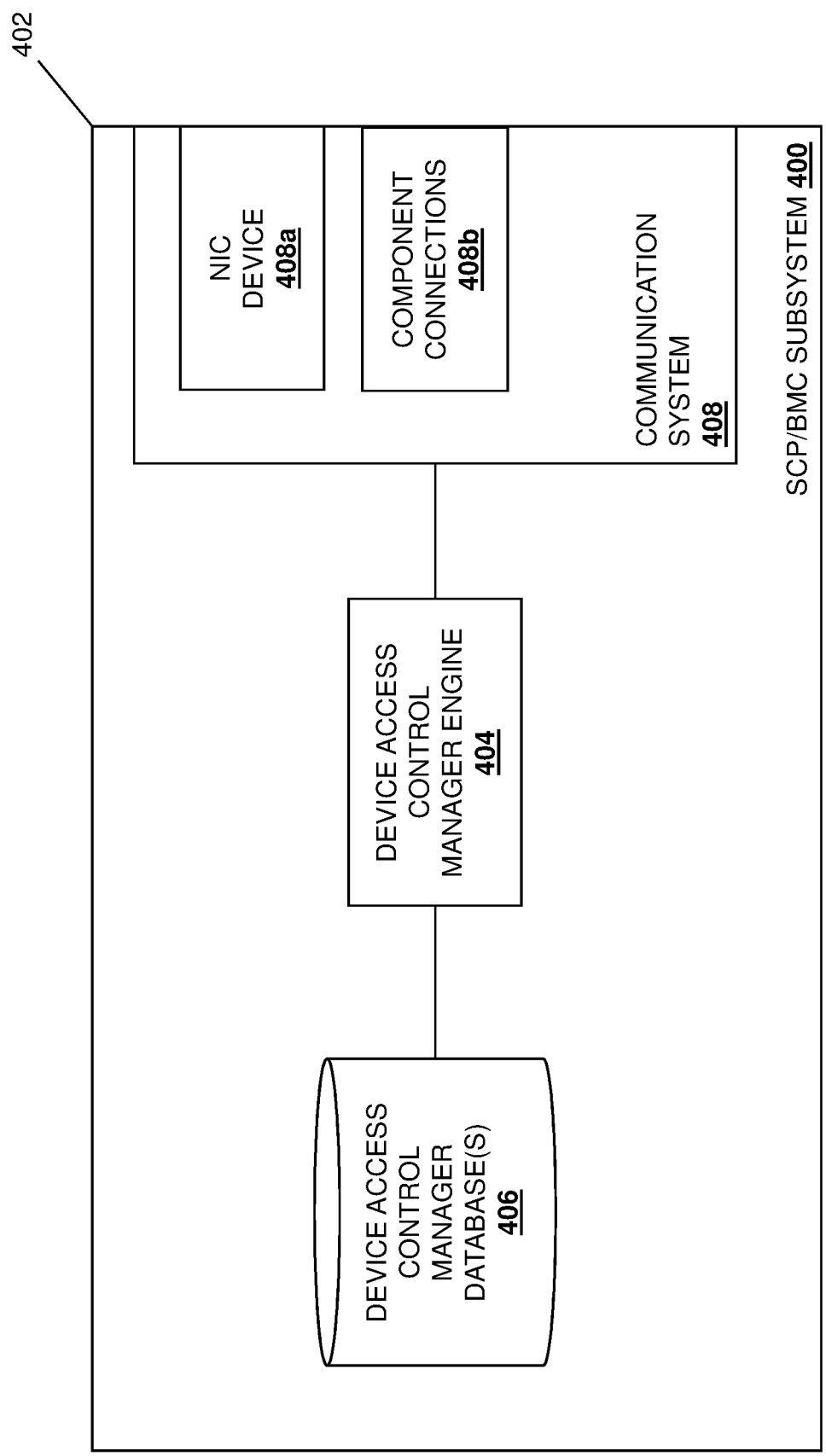
FIG. 4 is a schematic view illustrating an embodiment of a System Control Processor (SCP) subsystem and/or Baseboard Management Controller (BMC) subsystem that may be included in the computing system of FIG. 3.

With reference to FIG. 4, an embodiment of an SCP/BMC subsystem 400 is illustrated that may provide the SCP subsystem 304 and/or the BMC subsystem 310 discussed above with reference to FIG. 3. As such, the SCP/BMC subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board, and/or may be provided by a BMC device. However, while illustrated and discussed as being provided in different manners in a computing system 300, one of skill in the art in possession of the present disclosure will recognize that the functionality of the SCP/BMC subsystem 400 discussed below may be provided by other devices that are configured to operate similarly as the SCP/BMC subsystem 400 discussed below (e.g., other networking subsystems such as the SmartNIC device or the NIC device discussed above, etc.).

In the illustrated embodiment, the SCP/BMC subsystem 400 includes a chassis 402 (e.g., a circuit board) that supports the components of the SCP/BMC subsystem 400, only some of which are illustrated below. For example, the chassis 402 may support a secondary processing subsystem (which may be distinguished from the central processing subsystem 306 310 in the computing system 300 discussed herein) such as a networking/management processing subsystem (e.g., an SCP/BMC processing subsystem) including one or more networking/management processors (not illustrated, but which may include the processor 102 discussed above with reference to FIG. 1), and a secondary memory subsystem such as a networking/management memory subsystem (e.g., an SCP/BMC memory subsystem, not illustrated, but which may include the memory 114 discussed above with reference to FIG. 1) that is coupled to the secondary processing system and that includes instructions that, when executed by the secondary processing system, cause the secondary processing system to provide a device access control manager engine 404 that is configured to perform the functionality of the device access control manager engines and/or SCP/BMC subsystems discussed below.

The chassis 402 may also include a storage system (not illustrated, but which may include the storage 108 discussed above with reference to FIG. 1, the networking/management memory system discussed above, etc.) that is coupled to the device access control manager engine 404 (e.g., via a coupling between the storage system and the secondary processing subsystem) and that may include one or more device access control manager databases 406 that are configured to store any of the information utilized by the device access control manager engine 404 discussed below. The chassis 402 may also support a communication system 408 that is coupled to the device access control manager engine 404 (e.g., via a coupling between the communication system 408 and the secondary processing subsystem) and that may include the Network Interface Controller (NIC) device 408a illustrated in FIG. 4 that may connect the SCP/BMC subsystem 304/310/400 to the network 204, the component connections 408 illustrated in FIG. 4 that may connect the SCP/BMC subsystem 304/310/400 to components in the computing system 300, wireless communication systems (e.g., BLUETOOTH®, Near Field Communication (NFC) components, WiFi components, etc.), and/or any other communication components that would be apparent to one of skill in the art in possession of the present disclosure.

As such, the communication system 408 may include any of the connections discussed below between the SCP/BMC subsystem 400 and the network 204, the SCP subsystem 304, the central processing subsystem 310, the BMC subsystem 310, the I/O device(s) 312, the other devices 316, and/or any other components utilized with the computing system 202a/300. However, while a specific SCP/BMC subsystem 400 has been illustrated and described, one of skill in the art in possession of the present disclosure will recognize that SCP/BMC subsystems (or other networking/management subsystems operating according to the teachings of the present disclosure in a manner similar to that described below for the SCP/BMC subsystem 400) may include a variety of components and/or component configurations for providing the functionality discussed below while remaining within the scope of the present disclosure as well.

Figure 5:
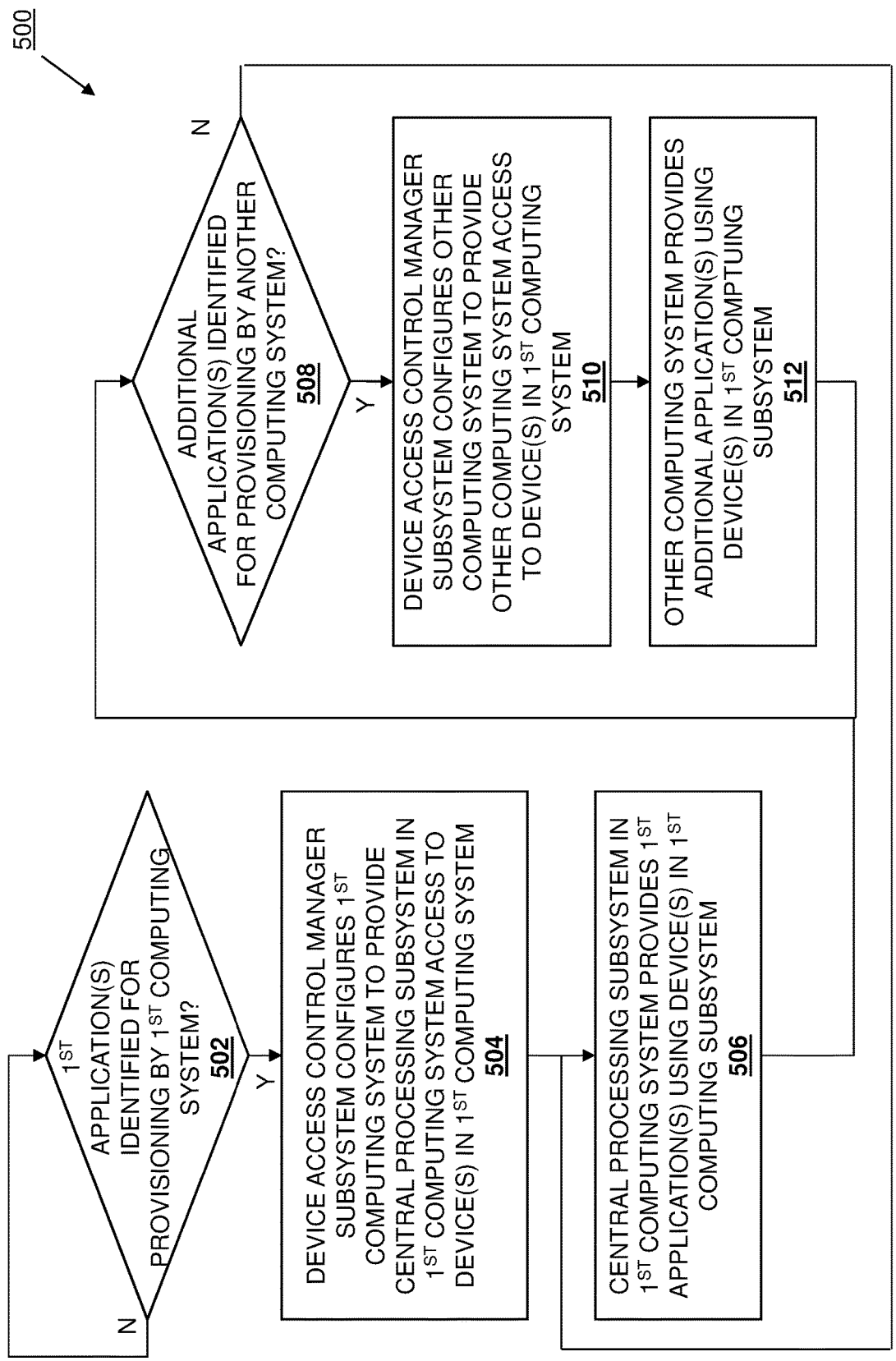
FIG. 5 is a flow chart illustrating an embodiment of a method for providing device access control.

Referring now to FIG. 5, an embodiment of a method 500 for providing device access control is illustrated. As discussed below, the systems and methods of the present disclosure provide for the dynamic configuration of access to devices within a computing system and/or their corresponding device functionality in order to, for example, provide local access for a central processing subsystem in that computing system to those devices and/or their device functionality, as well as remote access for central processing system(s) in other computing system(s) to those devices and/or their device functionality. For example, the device access control system of the present disclosure may include a computing system having a device access controller subsystem coupled to devices and a central processing subsystem. A device access control manager subsystem is coupled to the device access controller subsystem and operates, during initialization operations for the computing system, to identify application(s) that are configured to be provided by the central processing subsystem, and identify a first subset of the devices that satisfy application provisioning requirements for the application(s). The device access control management subsystem then configures the device access controller subsystem to provide the central processing subsystem access to the first subset of the devices in order to allow the central processing subsystem to provide the application(s), and disable access for the central processing subsystem to a second subset of the devices in order to prevent the central processing subsystem from using the second subset of the devices to provide the application(s). Thus, devices and/or device functionality in a computing system may be configured for the local and remote use in a manner that provide a more efficient use of those devices and/or their device functionality, and/or more optimal provisioning of applications than conventional composable systems.

The method 500 begins at decision block 502 where it is determined whether one or more first applications have been identified for provisioning by a first computing system. In the specific examples provided below, components and/or devices in the computing system 202a/300 are configured for local and remote use in providing applications. However, one of skill in the art in possession of the present disclosure will recognize that the techniques described below may be utilized to provide only local use of devices and/or their device functionality, or only remote use of devices and/or their device functionality, and may operate similarly to provide for local and/or remote use of devices and/or their device functionality in the computing systems 202b and up to 202c while remaining within the scope of the present disclosure as well. In an embodiment, at decision block 502, the device access control manager engine 404 in either or both of the SCP subsystem 304/400 and/or BMC subsystem 306/400 in the computing system 202a/300 may operate to determine whether application(s) have been identified for provisioning by the computing system 202a/300. For example, at decision block 502, the device access control manager engine 404 in either or both of the SCP subsystem 304/400 and/or BMC subsystem 306/400 in the computing system 202a/300 may operate to determine whether the management system 206 has identified application(s) for provisioning by the computing system 202a/300, although one of skill in the art in possession of the present disclosure will recognize that application(s) for provisioning by a computing system may be identified in a variety of manners that will fall within the scope of the present disclosure as well.

In some examples, the identification of application(s) for provisioning by the computing system 202a/300 at block 502 may be performed prior to or during a computing system initialization process (e.g., a boot process) for the computing system 202a/300 so that the method 500 is performed prior to or as part of that computing system initialization process to provide the central processing subsystem 310 in the computing system 202a/300 access to the devices in the computing system 202a/300. As will be appreciated by one of skill in the art in possession of the present disclosure, the performance of the method 500 prior to or as part of a computing system initialization process in order to define how an application may access devices and/or device functionality may provide benefits for applications that can experience issues if access to a device and/or device functionality is removed during runtime. For example, some operating systems/applications may "crash", malfunction, or otherwise experience issues with their operation if access to a device and/or device functionality is removed during runtime of the computing system in which the operating system/application is running. For example, the removal of a USB device from a USB connector on a computing system may cause issues with the operation of the operating system/application, as may the "hot removal" of a GPU device from that computing system (e.g., and the associated loss of application space provided by that GPU device).

However, one of skill in the art in possession of the present disclosure will appreciate how such operating systems/applications may not experience similar issues when access to devices and/or device functionality is enabled added during runtime (e.g., the connection of a USB device to a USB connector on the computing system, the "hot plugging" of a GPU device to the computing system, etc.), thus allowing for the device access enablement operations during runtime as discussed below without corresponding negative issues with regard to the operation of the operating systems/applications. Furthermore, while some operating systems/applications may not experience issues when device and/or device functionality access is disabled during runtime, the systems and methods of the present disclosure reduce the possibility of operating system/application "crashes", malfunctions, and/or other issues by disabling device and/or device functionality access prior to the operating system/application initialization process (e.g., early in a computing system initialization process and prior to the initialization of the operating system/application)]

However, in other examples, the identification of application(s) for provisioning by the computing system 202a/300 at block 502 may be performed during runtime of the computing system 202a/300 so that the method 500 is performed during runtime for the computing system 202a/300 to provide the central processing subsystem 310 in the computing system 202a/300 access to the devices and/or device functionality in the computing system 202a/300. Furthermore, one of skill in the art in possession of the present disclosure will appreciate that the techniques described herein may be performed in a variety of scenarios to control the access to devices and/or device functionality in the computing system 202a/300 while remaining within the scope of the present disclosure as well. For example, as discussed in further detail below, access for an application to devices and/or device functionality may be enabled or disabled prior to or during computing system initialization operations, and then that device and/or device functionality access may be modified during computing system runtime based on the changing requirements of that application (e.g., to enable device/device functionality access if it was disabled and is now needed by the application, or to disable device/device functionality access if it was enabled and is no longer needed by the application). If, at decision block 502, it is determined that one or more first applications have not been identified for provisioning by the first computing system, the method 500 returns to decision block 502. As such, the method 500 may loop such that the device access control manager engine 404 in either or both of the SCP subsystem 304/400 and/or BMC subsystem 306/400 in the computing system 202a/300 monitors for the identification of application(s) for provisioning by the computing system 202a/300.

Figure 6A:
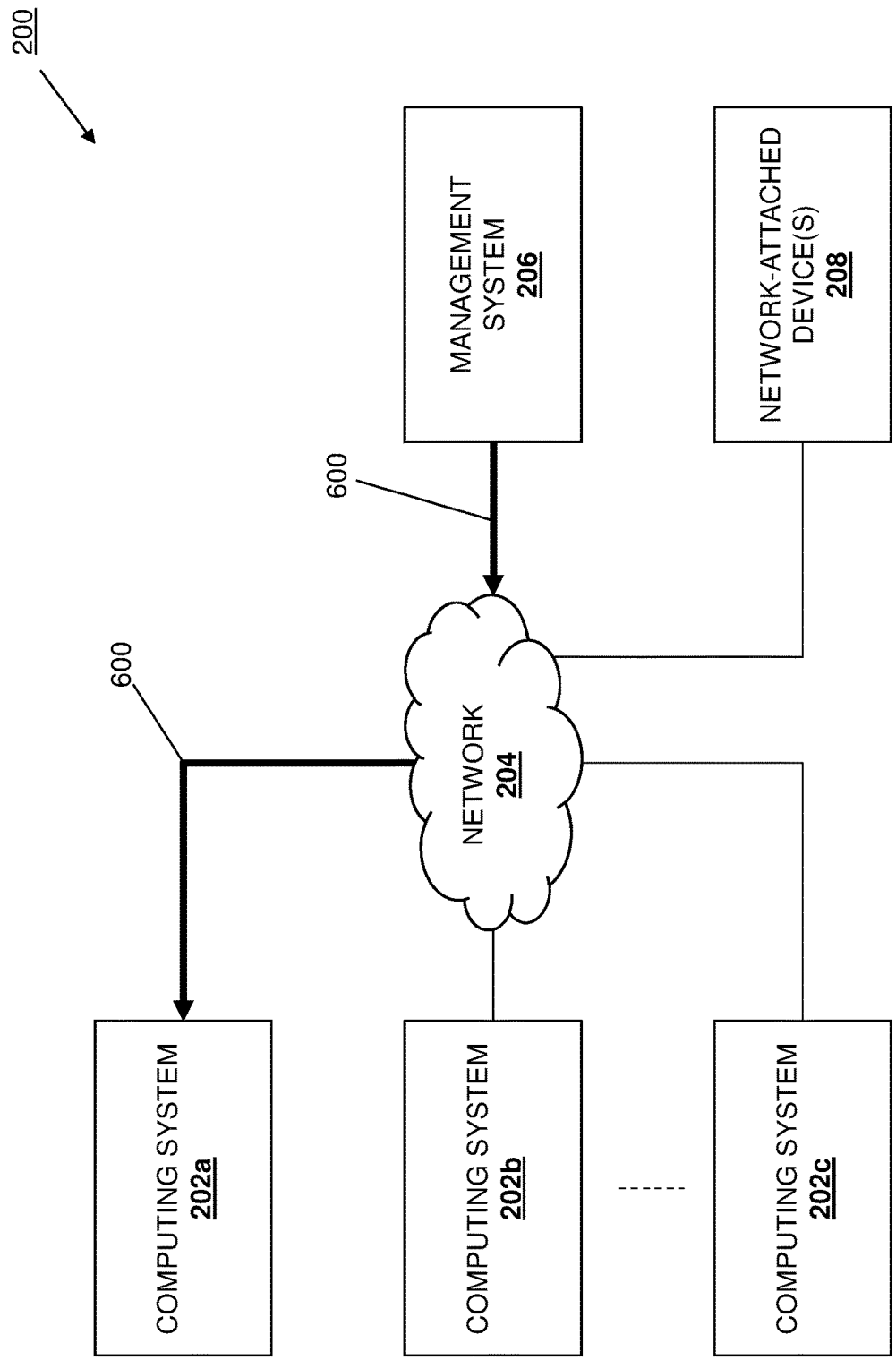
FIG. 6A is a schematic view illustrating an embodiment of the networked system of FIG. 2 operating during the method of FIG. 5.

If, at decision block 502, it is determined that one or more first applications have been identified for provisioning by the first computing system, the method 500 proceeds to block 504 where a device access control manager subsystem configures the first computing system to provide a central processing subsystem in the first computing system access to one or more devices and/or device functionality in the first computing system. As will be appreciated by one of skill in the art in possession of the present disclosure, "device access" as discussed below may refer to access to the entirety of a device, access to a portion of a device (e.g., a portion of a memory device or a storage device), access to particular functionality provided by a device (e.g., access to a core of a processor, access to a particular frequency of operation of a processor or processor core, access to acceleration functionality for a processor, etc.), and/or any other device access characteristics that would be apparent to one of skill in the art in possession of the present disclosure. With reference to FIG. 6A, in an embodiment of decision block 502, the management system 206 may perform application provisioning instruction operations 600 that include generating and transmitting application provisioning instructions via the network 204 to the computing system 202a, with those application provisioning instructions identifying applications that will be provisioned using devices and/or device functionality in the computing system 202a/300. In the examples below, the application provisioning instructions provided at decision block 502 identify first application(s) for provisioning by the central processing subsystem 310 in the computing system 202a/300 using devices and/or device functionality in the computing system 202a/300. However, one of skill in the art in possession of the present disclosure will appreciate that applications may be provisioned by a variety of systems and subsystems using devices and/or device functionality in a computing system, and thus the application provisioning instructions may instruct the provisioning of applications by those systems and subsystems while remaining within the scope of the present disclosure as well.

With reference to FIG. 6B, in some embodiments of decision block 502, the SCP subsystem 304 in the computing system 202a/300 may receive the application provisioning instructions as part of the application provisioning instruction operations 600. With reference to FIG. 6C, in other embodiments of decision block 502, the BMC subsystem 306 in the computing system 202a/300 may receive the applications provisioning instructions as part of the application provisioning instruction operations 600. Thus, with reference to FIG. 6E, at decision block 502 the device access control manager engine 404 in the SCP subsystem 304/400 or BMC subsystem 306/400 in the computing system 202a/300 may receive the application provisioning instructions as part of the application provisioning instruction operations 600 via the NIC device 408a in the communication system 408a and, in response, identify the application(s) for provisioning using devices and/or device functionality in the computing system 202a/300.

Figure 6D:
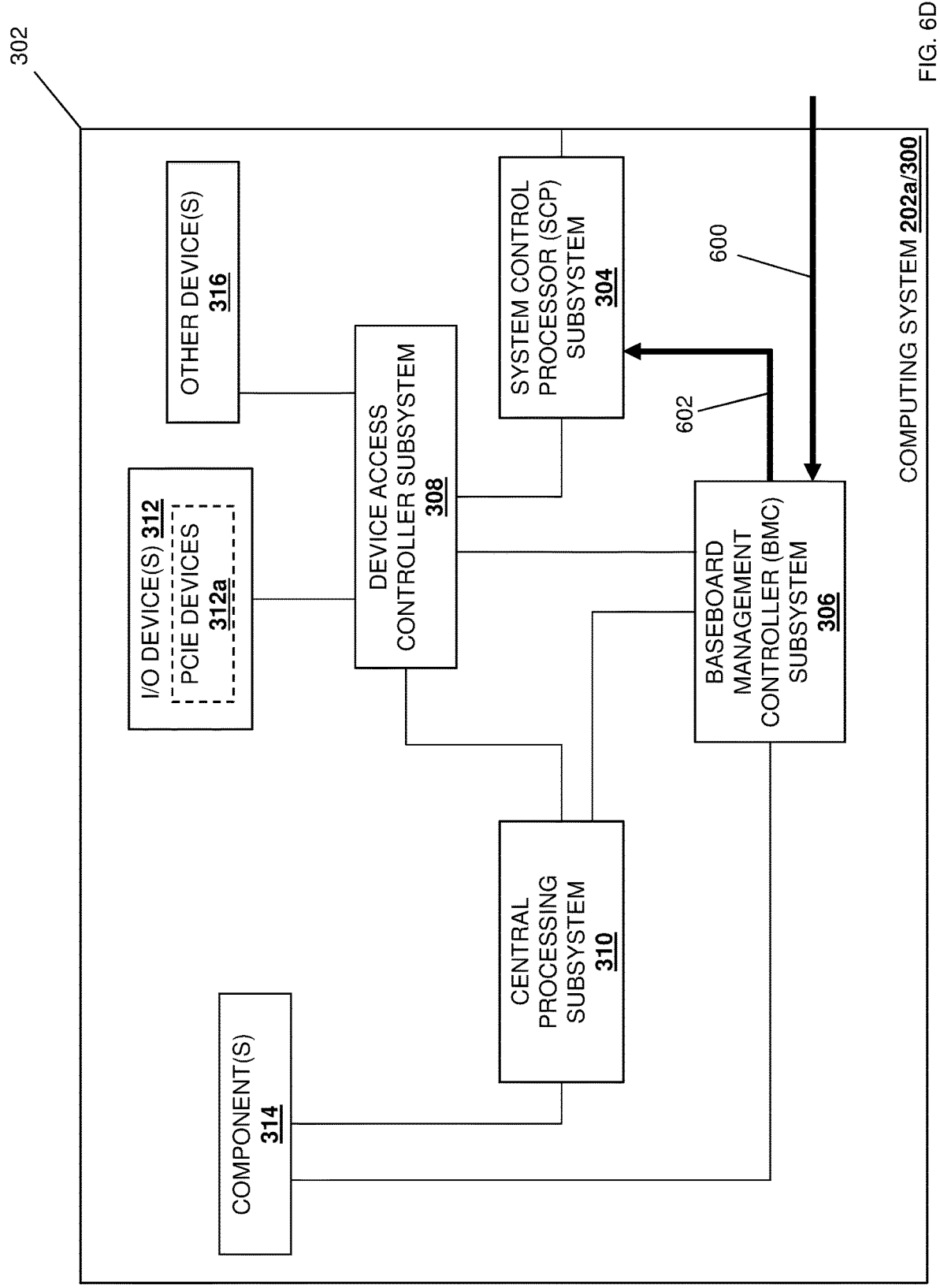
FIG. 6D is a schematic view illustrating an embodiment of the computing system of FIG. 3 operating during the method of FIG. 5.
Figure 6F:
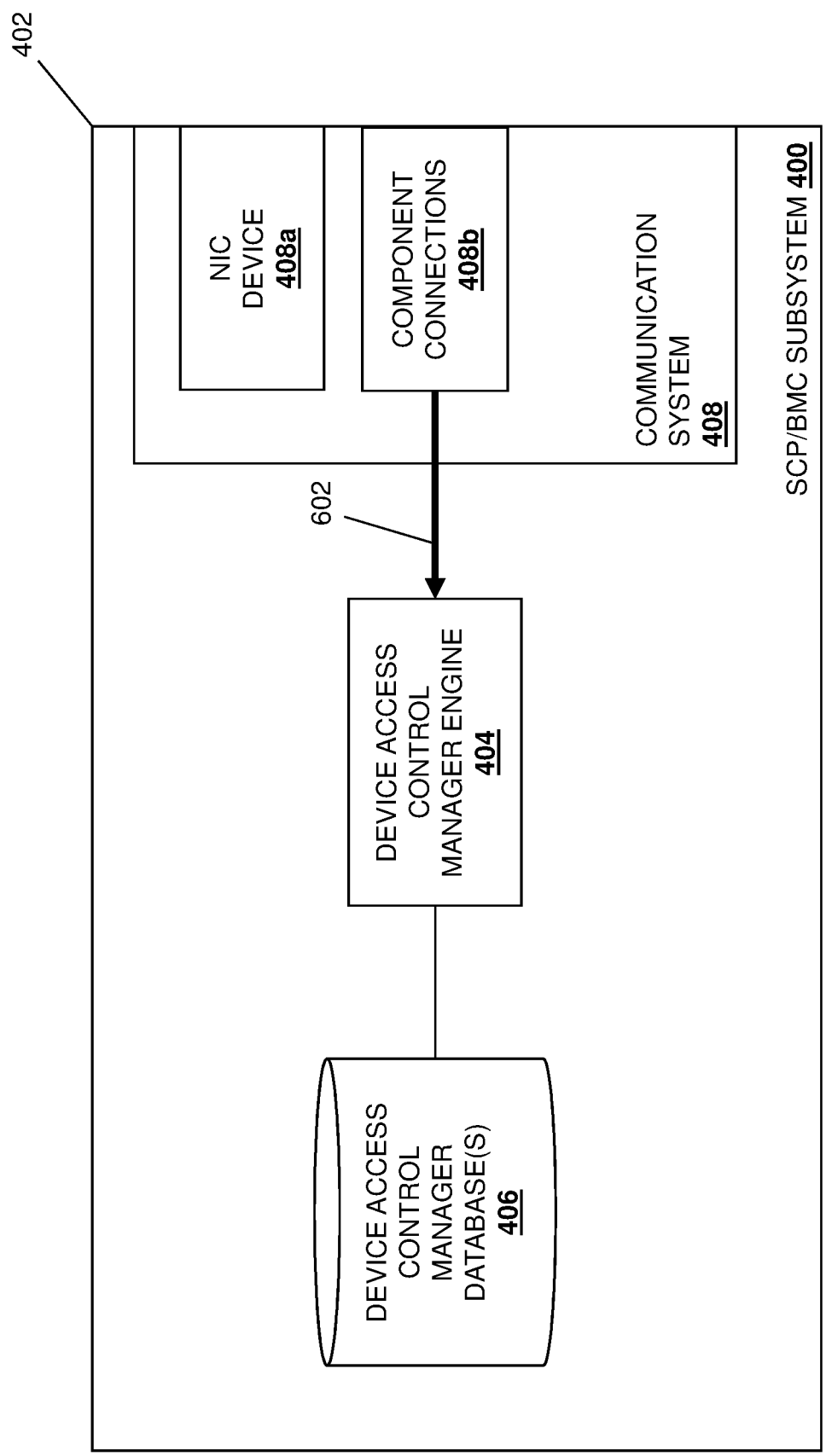
FIG. 6F is a schematic view illustrating an embodiment of the SCP subsystem of FIG. 4 operating during the method of FIG. 5.

With reference to FIG. 6D, in yet other embodiments of decision block 502, the BMC subsystem 306 in the computing system 202a/300 may receive the application provisioning instructions as part of the application provisioning instruction operations 600, and may perform application provisioning instruction forwarding operations 602 to forward those application provisioning instructions to the SCP subsystem 304 in the computing system 202a/300. Thus, at decision block 502, the device access control manager engine 404 in the BMC subsystem 306/400 in the computing system 202a/300 may receive the application provisioning instructions as part of the application provisioning instruction operations 600 via the NIC device 408a in the communication system 408a (as illustrated in FIG. 6E) and then forward those application provisioning instructions via the component connections 408b in the communication system 408 as part of the application provisioning instruction forwarding operations 602, while the device access control manager engine 404 in the SCP subsystem 304/400 in the computing system 202a/300 may receive the application provisioning instructions as part of the application provisioning instruction forwarding operations 602 via the component connections 408b in the communication system 408 and identify the application(s) for provisioning using devices and/or device functionality in the computing system 202a/300.

As discussed above, in the specific examples provided herein, the application provisioning instructions received at decision block 502 identify first application(s) for provisioning by the central processing subsystem 310 in the computing system 202a/300 using devices and/or device functionality in the computing system 202a/300. Thus, the application provisioning instructions may include any identifying information associated with the first application(s) that will be provisioned using devices and/or device functionality in the computing system 202a/300, any identifying information about the central processing subsystem 310 in the computing system 202a/300 that will provide the first application(s), any information about devices and/or device functionality that will be needed to provide the first application(s) (e.g., an optimal subset of devices included in and/or external to the computing system 202a/300 for use in providing the first application(s), particular device functionality required by devices included in and/or external to the computing system 202a/300 for use in providing the first application(s), etc.), and/or any other information that one of skill in the art in possession of the present disclosure would recognize as allowing for the device access control configurations discussed in further detail below.

As will be appreciated by one of skill in the art in possession of the present disclosure, the application provisioning instructions may also include any information that identifies which of devices and/or device functionality in the computing system 202a/300 should be configured for local access, which of devices and/or device functionality in the computing system 202a/300 should be configured for remote access, which of devices and/or device functionality in the computing system 202a/300 should be configured to prevent access (e.g., in an as-a-service environment in which access to those devices and/or device functionality has not been paid for, to prevent the accrual of licensing fees associated with the use of those devices and/or device functionality, to prevent security issues presented by those devices and/or device functionality, to prevent access to devices operating with unvalidated firmware, to prevent access to memory/storage devices and/or portions of memory/storage devices that store sensitive data, etc.), and/or any other application/device configuration information that would be apparent to one of skill in the art in possession of the present disclosure.

As such, in some specific examples, application provisioning instructions may identify device functionality such as a number of CPU cores that should be utilized, a CPU core processing frequency that should be utilized, whether a hardware accelerator should be utilized with CPU core(s), an amount of memory that should be utilized, networks that should be utilized, and/or any other application provisioning information that would be apparent to one of skill in the art in possession of the present disclosure. While the discussion below focuses on a computing system in which some of its devices are configured for local access and some of its devices are configured for remote access, one of skill in the art in possession of the present disclosure will appreciate that a computing system may have its devices configured for local access only or remote access only while remaining within the scope of the present disclosure as well. Furthermore, in either situation the device-access-prevention discussed above may be utilized to prevent application provisioning with particular device(s) and/or device functionality (e.g., a computing system may have some devices and/or device functionality configured for local access and other devices and/or device functionality configured for no access with regard to the provisioning of any application). As such, in a specific example, the device functionality access identified for an application at block 504 may identify whether hardware accelerator functionality should be enabled or disabled for the central processing system 310 providing that application, how many processing system cores should be enabled/disabled in the central processing system providing that application, portions of memory devices or storage devices that access should be enabled or disabled to when providing that application, etc.

Figure 7A:
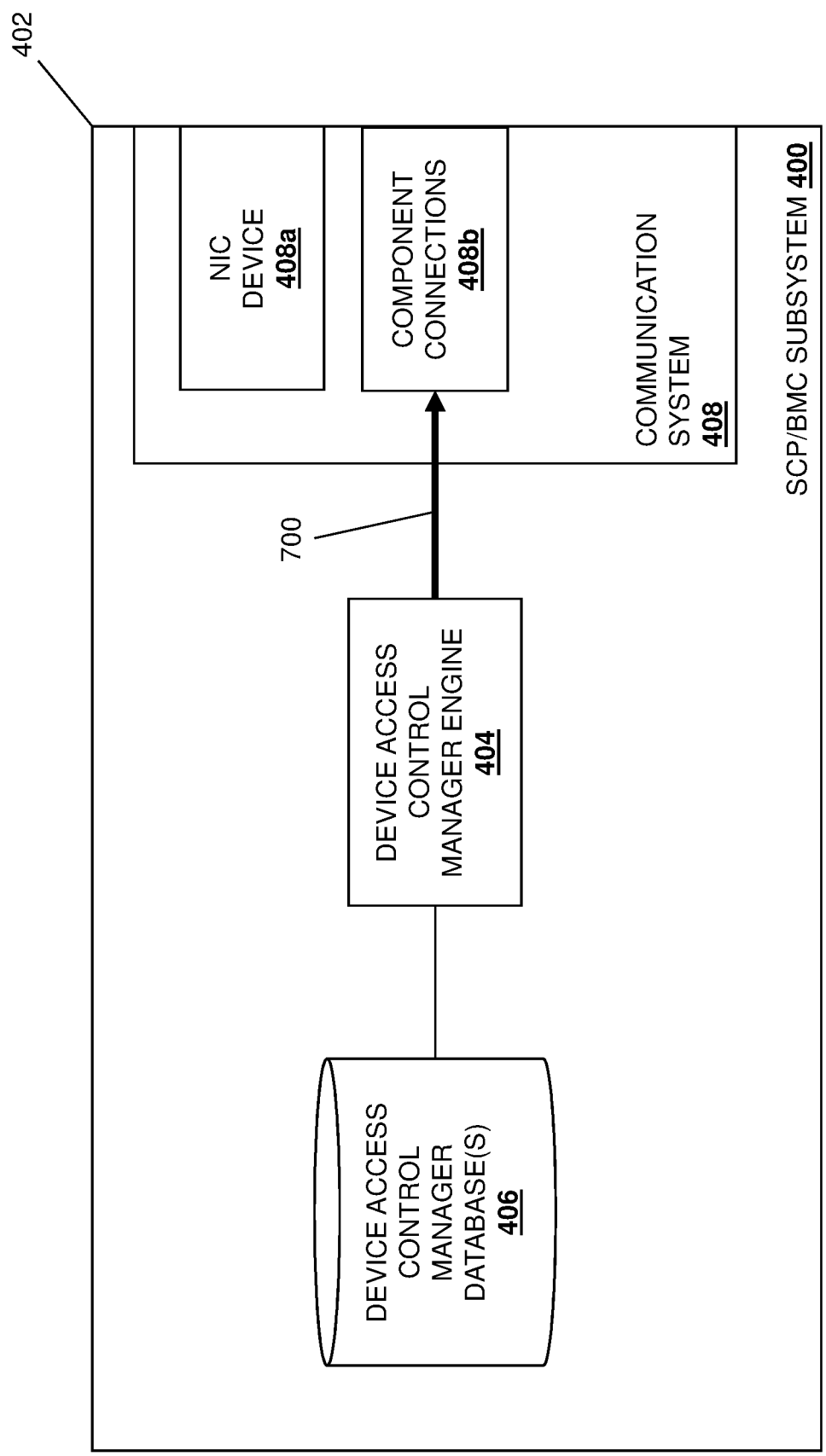
FIG. 7A is a schematic view illustrating an embodiment of the SCP subsystem of FIG. 4 operating during the method of FIG. 5.

Thus, in some embodiments of block 504, the SCP subsystem 304/400 in the computing system 202*a*/300 may operate to configure the central processing system 310 in the computing system 202*a*/300 to provide an application, and or configure the computing system 202*a*/300 to provide the central processing subsystem 310 in the computing system 202*a*/300 access to one or more devices and/or device functionality in the computing system 202*a*/300 to provide the application. For example, with reference to FIG. 7A, at block 504 the device access control manager engine 404 in the SCP subsystem 304/400 in the computing system 202*a*/300 may perform "local" device access configuration operations 700 that may include generating and transmitting device access configuration communications via the component connections 408*a* in the communication system 408. As will be appreciated by one of skill in the art in possession of the present disclosure, the device access control manager engine 404 in the SCP subsystem 304/400 in the computing system 202*a*/300 may perform a variety of "local" access configuration operations to configure the central processing system 310 and/or configure the computing system 202*a*/300 to provide the central processing subsystem 310 in the computing system 202*a*/300 access to one or more devices and/or device functionality in the computing system 202*a*/300 (e.g., devices and/or device functionality that has been identified for providing the first application(s)), a few specific examples of which are illustrated and discussed below).

Figure 7B:
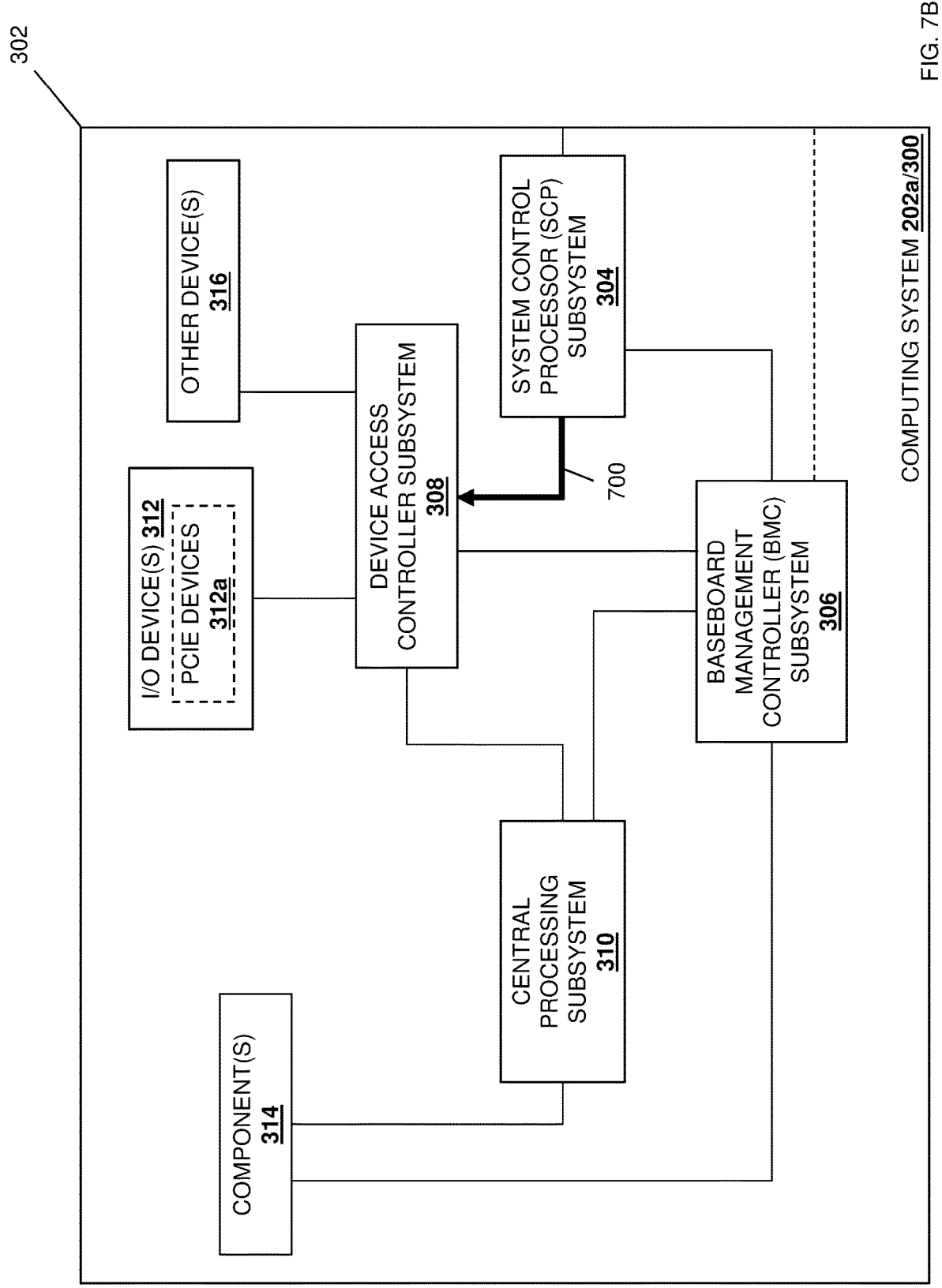
FIG. 7B is a schematic view illustrating an embodiment of the computing system of FIG. 3 operating during the method of FIG. 5.

For example, with reference to FIG. 7B, the SCP subsystem 304/400 in the computing system 202*a*/300 may transmit the device access configuration communications to the device access controller subsystem 308 as part of the local device access configuration operations 700, and those device access configuration communications may identify configuration information for communication technologies such a fabric switches (e.g., PCIe configuration information for PCIe switches) via a PCIe bus, a Universal Serial Bus (USB), a System Management Bus (SMBUS), an Inter-Integrated Circuit (I2C) bus, a serial port, an Ethernet port, and/or other communication techniques known in the art. Furthermore, one of skill in the art in possession of the present disclosure will appreciate that device access configuration communications may include other commands, instructions, or other communications to configure a fabric switch device or other device access controller subsystem to provide the central processing subsystem access to the I/O device(s) 312, PCIe device(s) 312*a*, other device(s) 316, and/or network-attached device(s) 208 (i.e., via the SCP subsystem 304) that will be utilized by the central processing subsystem 310 in providing the first application(s) identified at decision block 502).

In another example, with reference to FIG. 7C, the SCP subsystem 304/400 in the computing system 202*a*/300 may transmit the device access configuration communications to the central processing subsystem 310 via the device access controller subsystem 308 as part of the device access configuration operations 700, and those device access configuration communications may include Basic Input/Output System (BIOS) configuration communications (e.g., by enabling/disabling BIOS configuration settings that control device access via direct writes to a BIOS configuration memory subsystem), and/or any other commands, instructions, or other communications that one of skill in the art in possession of the present disclosure would recognize as configuring a central processing subsystem for accessing the I/O device(s) 312, PCIe device(s) 312*a*, other device(s) 316, and/or network-attached device(s) 208 (i.e., via the SCP subsystem 304) that will be utilized by the central processing subsystem 310 in providing the first application(s) identified at decision block 502. As such, one of skill in the art in possession of the present disclosure will recognize that BIOS configurations may be performed during boot operations for the computing system 202*a*/300 to enable access by the central processing subsystem 310 to one or more devices and/or device functionality in the computing system 202*a*/300 for use in providing the first application(s) and, in some examples, the BIOS configurations may be performed to prevent access by the central processing subsystem 310 to those devices and/or device functionality in the computing system 202*a*/300 (i.e., when those devices and/or device functionality are not needed in providing the first application(s), the use of those devices and/or device functionality is associated with the accrual of licensing fees, those devices and/or device functionality present security issues, those devices are operating with unvalidated firmware, those devices store sensitive data, etc.).

Figure 7D:
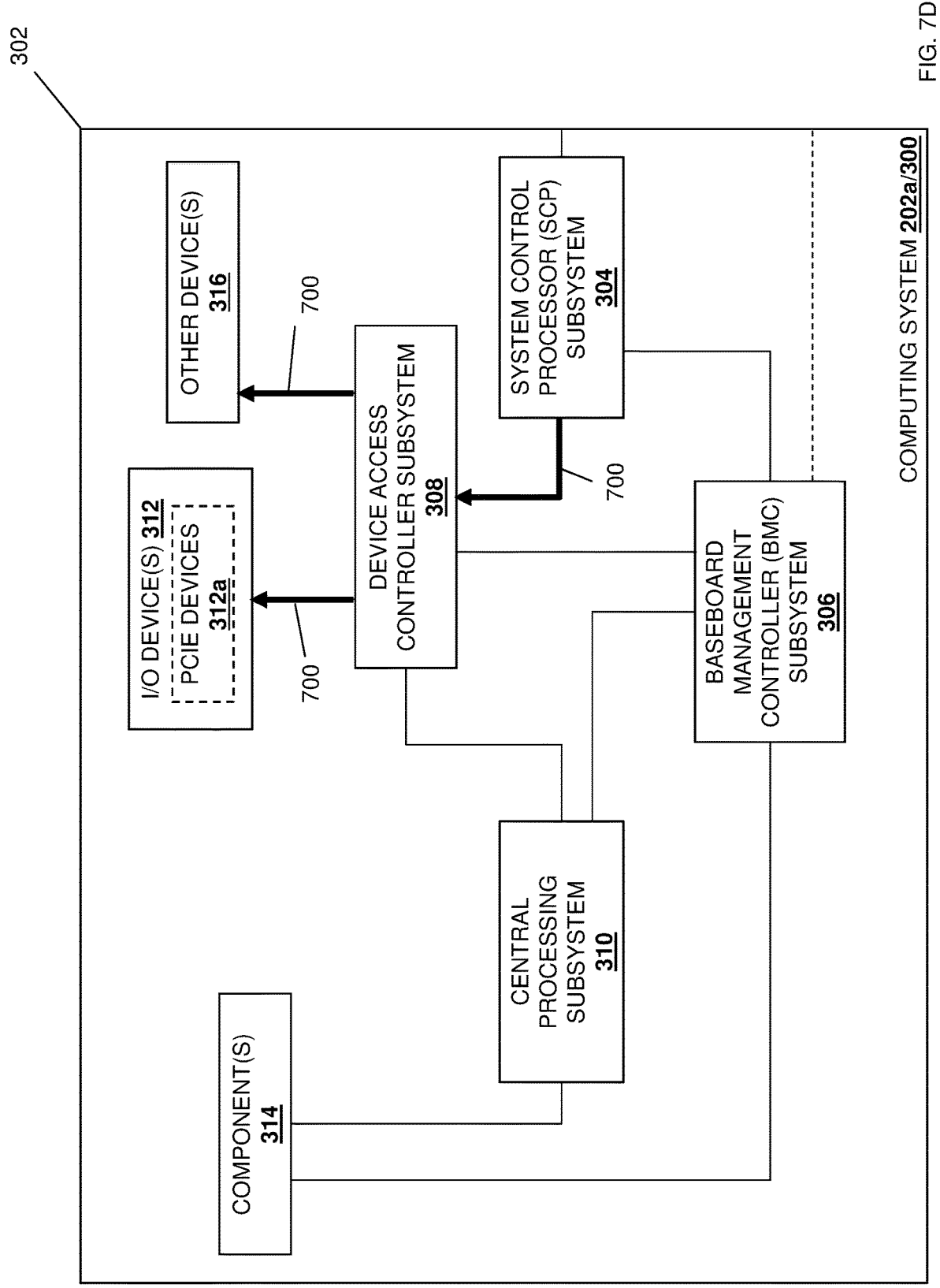
FIG. 7D is a schematic view illustrating an embodiment of the computing system of FIG. 3 operating during the method of FIG. 5.

In another example, with reference to FIG. 7D, the SCP subsystem 304/400 in the computing system 202*a*/300 may transmit the device access configuration communications to the I/O device(s) 312, PCIe device(s) 312*a*, other device(s) 316 via the device access controller subsystem 308 as part of the device access configuration operations 700, and those device access configuration communications may include device configuration communications (e.g., Self-Encrypting Drive (SED) lock/unlock communications to prevent/allow access to a storage device, instructions to disable or enable access to particular portions of a memory device or storage device, etc.), and/or any other commands, instructions, or other communications that one of skill in the art in possession of the present disclosure would recognize as configuring a device to allow access by the central processing subsystem to the I/O device(s) 312, PCIe device(s) 312*a*, and/or other device(s) 316 (or at least some of their corresponding device functionality) that will be utilized by the central processing subsystem 310 in providing the first application(s) identified at decision block 502. As will be appreciated by one of skill in the art in possession of the present disclosure, while the device access controller subsystem 308 is described as being used to transmit the device access configuration communications to the I/O device(s) 312, PCIe device(s) 312*a*, other device(s) 316, other communication paths (e.g., SMBUS, 120, etc.) may be utilized to do so while remaining within the scope of the present disclosure as well. As such, one of skill in the art in possession of the present disclosure will recognize that device configurations may be performed to unlock devices and enable access by the central processing subsystem 310 to those devices and/or their device functionality in the computing system 202a/300 for use in providing the first application(s) and, in some examples, device configurations may be performed to lock devices and disable access by the central processing subsystem 310 to those devices and/or their device functionality in the computing system 202a/300 (i.e., when those devices and/or device functionality are not needed in providing the first application(s), the use of those devices and/or device functionality is associated with the accrual of licensing fees, those devices and/or device functionality present security issues, those devices are operating with unvalidated firmware, those devices store sensitive data, etc.).

Figure 7E:
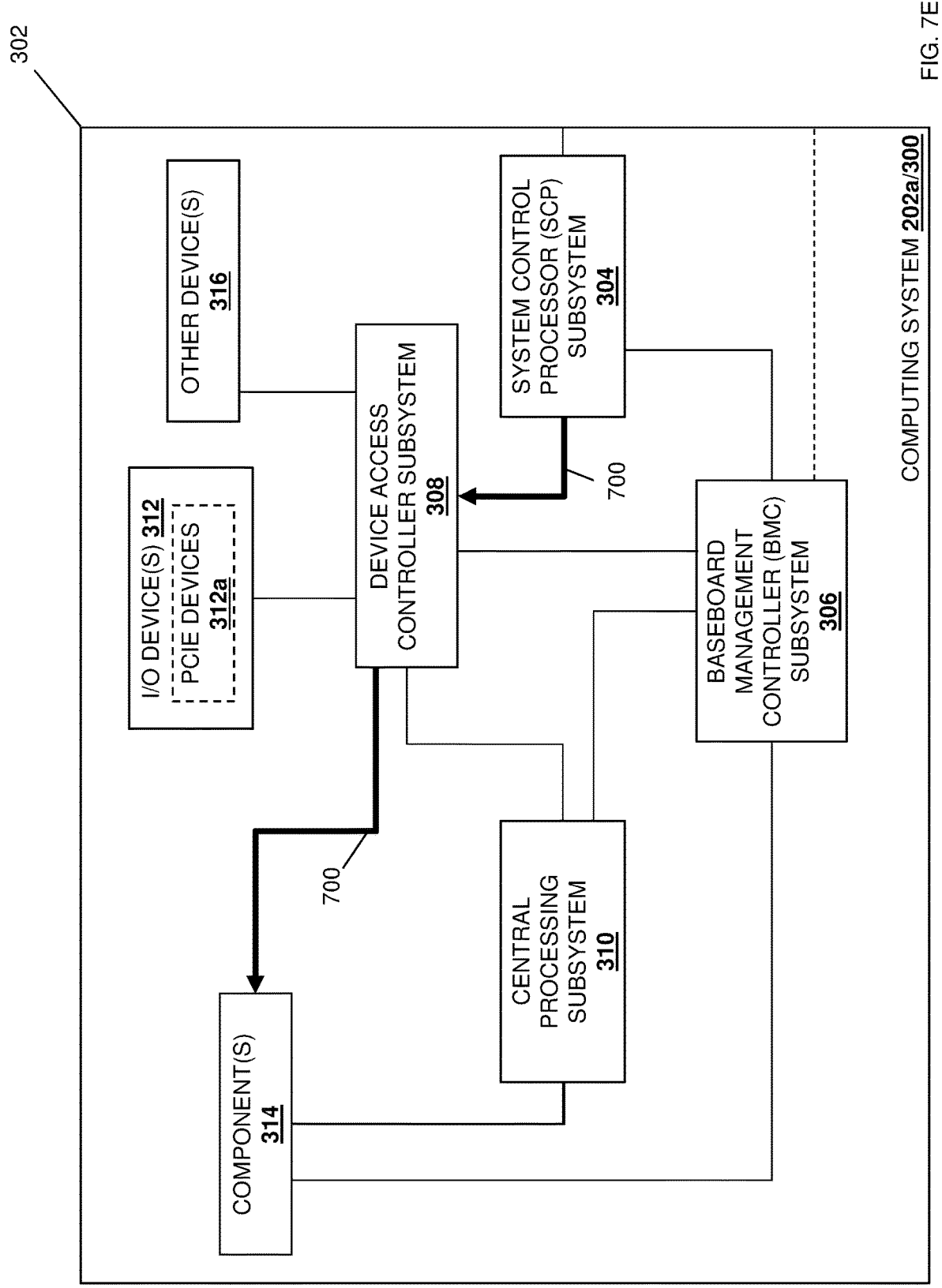
FIG. 7E is a schematic view illustrating an embodiment of the computing system of FIG. 3 operating during the method of FIG. 5.

In another example, with reference to FIG. 7E, the SCP subsystem 304/400 in the computing system 202a/300 may transmit the device access configuration communications to the component(s) 314 via the device access controller subsystem 308 as part of the device access configuration operations 700, and those device access configuration communications may include component configuration communications (e.g., Self-Encrypting Drive (SED) lock or unlock communicates to allow or disable access to a storage device, instructions to disable or enable access to particular portions of a memory device or storage device, etc.), and/or any other commands, instructions, or other communications that one of skill in the art in possession of the present disclosure would recognize as configuring a device to allow access by the central processing subsystem to the component(s) 314 that will be utilized by the central processing subsystem 310 in providing the first application(s) identified at decision block 502.

As will be appreciated by one of skill in the art in possession of the present disclosure, the device access configuration operations 700 between the device access controller subsystem 308 and the component(s) 314 may be performed without the central processing subsystem 310 running or otherwise participating in the transmission, and thus may utilize the SMBUS communication channels, I2C communication channels, and/or other signaling paths that are available between the device access controller subsystem 308 and the component(s) 314. As such, one of skill in the art in possession of the present disclosure will recognize that component configurations may be performed to unlock components and enable access by the central processing subsystem 310 to those components and/or their component functionality in the computing system 202a/300 for use in providing the first application(s) and, in some examples, component configurations may be performed to lock components and disable access by the central processing subsystem 310 to those components and/or their component functionality in the computing system 202a/300 (i.e., when those components and/or their component functionality are not needed in providing the first application(s), the use of those components and/or their component functionality is associated with the accrual of licensing fees, those components and/or their component functionality present security issues, those components are operating with unvalidated firmware, those components store sensitive data, etc.).

However, while several specific "local" device access configuration operations 700 have been described to configure the central processing system 310 to provide an application, and/or configure the computing system 202a/300 to provide the central processing subsystem 310 in the computing system 202a/300 access to one or more devices and/or device functionality in the computing system 202a/300 to provide the application, other local device access configuration operations will fall within the scope of the present disclosure as well. For example, the SCP subsystem 304/400 in the computing system 202a/300 may transmit the device access configuration communications to a power subsystem (not illustrated) in the computing system 202a/300 as part of the device access configuration operations 700, and those device access configuration communications may include power configuration communications (e.g., power control configurations to enable power to devices and/or device functionality in the computing system 202a/300), and/or any other commands, instructions, or other communications that one of skill in the art in possession of the present disclosure would recognize as configuring power to a device and/or device functionality to allow access by the central processing subsystem to the I/O device(s) 312, PCIe device(s) 312a, component(s) 314, and/or other device(s) 316 that will be utilized by the central processing subsystem 310 in providing the first application(s) identified at decision block 502. In a specific example of the use of power configuration to control device functionality access, power may be enabled and/or disabled to processor sockets in the central processing subsystem in order to enable/disable access to different processors, and similar techniques may be utilized to enable disable access to different processing cores in a processor, or enable/disable access to hardware accelerators available with a processor, if such power configuration functionality is present in that processor.

As will be appreciated by one of skill in the art in possession of the present disclosure, some computing systems may include separate power controls for individual device/components slots in that computing system (e.g., power control circuitry in a motherboard), and those separate power controls may be utilized to power/prevent power to any device/component and/or component/device functionality in the computing system. Furthermore, some storage devices (e.g., SATA storage devices, SAS storage devices, NVMe storage devices, etc.) may include "power disable" controls (e.g., power disable pins on their connectors) that may be utilized to power/prevent power to any device/component and/or component/device functionality in the computing system. As such, one of skill in the art in possession of the present disclosure will recognize that power configurations may be performed to enable power to components/devices and/or component/device functionality and thus enable access by the central processing subsystem 310 to those components/devices and/or component/device functionality in the computing system 202a/300 for use in providing the first application(s) and, in some examples, power configurations may be performed to disable power to components/devices and/or component/device functionality and thus disable access by the central processing subsystem 310 to those components/devices and/or component/device functionality in the computing system 202a/300 (i.e., when those components/devices and/or component/device functionality are not needed in providing the first application(s), the use of those components/devices and/or component/device functionality is associated with the accrual of licensing fees, those components/devices and/or component/device functionality present security issues, those components/devices are operating with unvalidated firmware, those components/devices store sensitive data, etc.). For example, as discussed above, power may be enabled to a first CPU socket in the central processing system 310 while being disabled to a second CPU socket in the central processing system 310 so that an application can only use a first CPU connected to the first CPU socket.

Figure 7F:
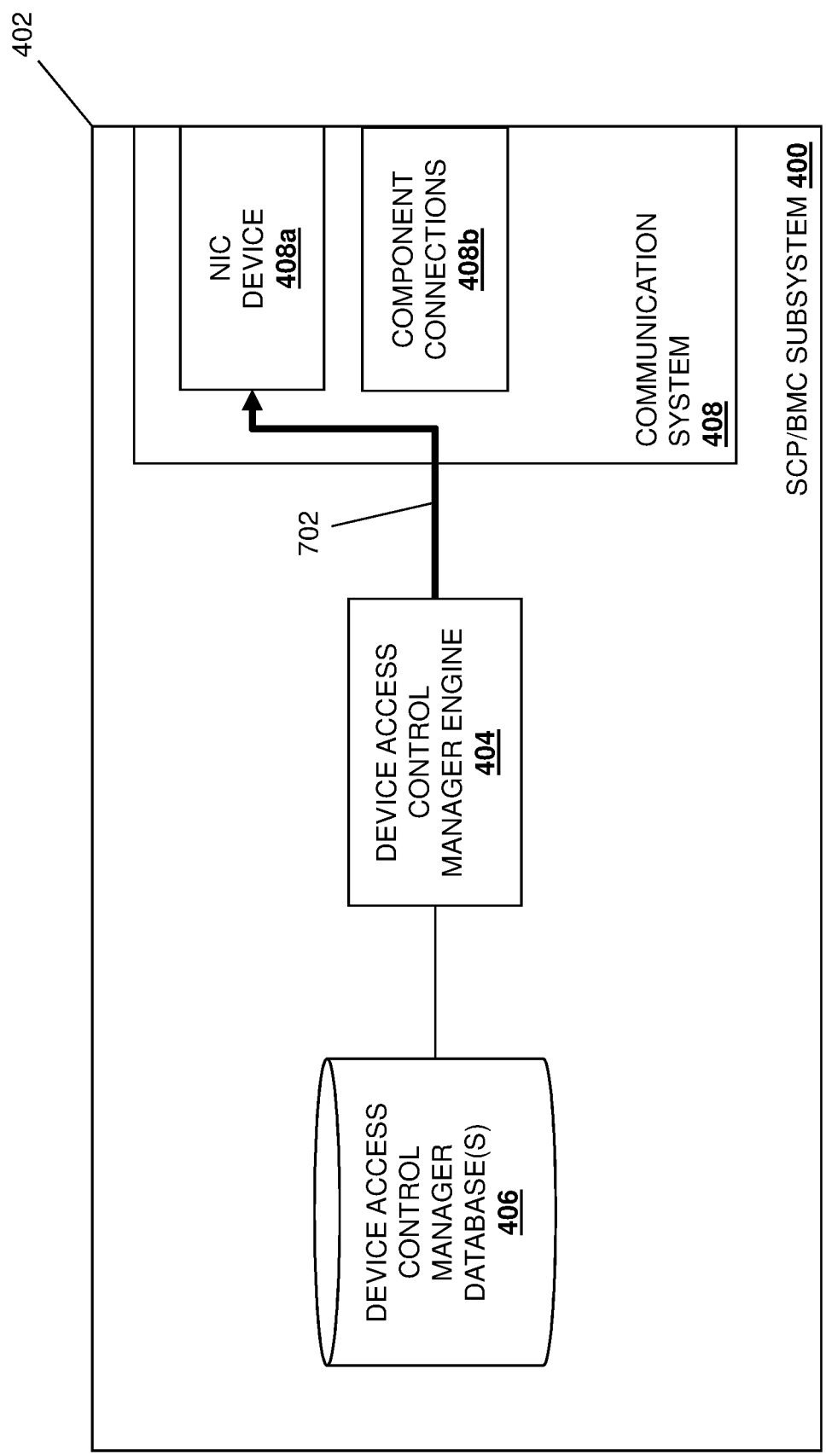
FIG. 7F is a schematic view illustrating an embodiment of the SCP subsystem of FIG. 4 operating during the method of FIG. 5.

In some embodiments, with reference to FIG. 7F, at block 504 the device access control manager engine 404 in the SCP subsystem 304/400 in the computing system 202a/300 may perform "remote" device access configuration operations 702 that may include generating and transmitting device access configuration communications via the NIC device 408a in the communication system 408. As will be appreciated by one of skill in the art in possession of the present disclosure, the device access control manager engine 404 in the SCP subsystem 304/400 in the computing system 202a/300 may perform a variety of access configuration operations to configure access for the central processing subsystem 310 in the computing system 202a/300 to one or more devices and/or device functionality via the network 204, a few specific examples of which are illustrated and discussed below.

Figure 7G:
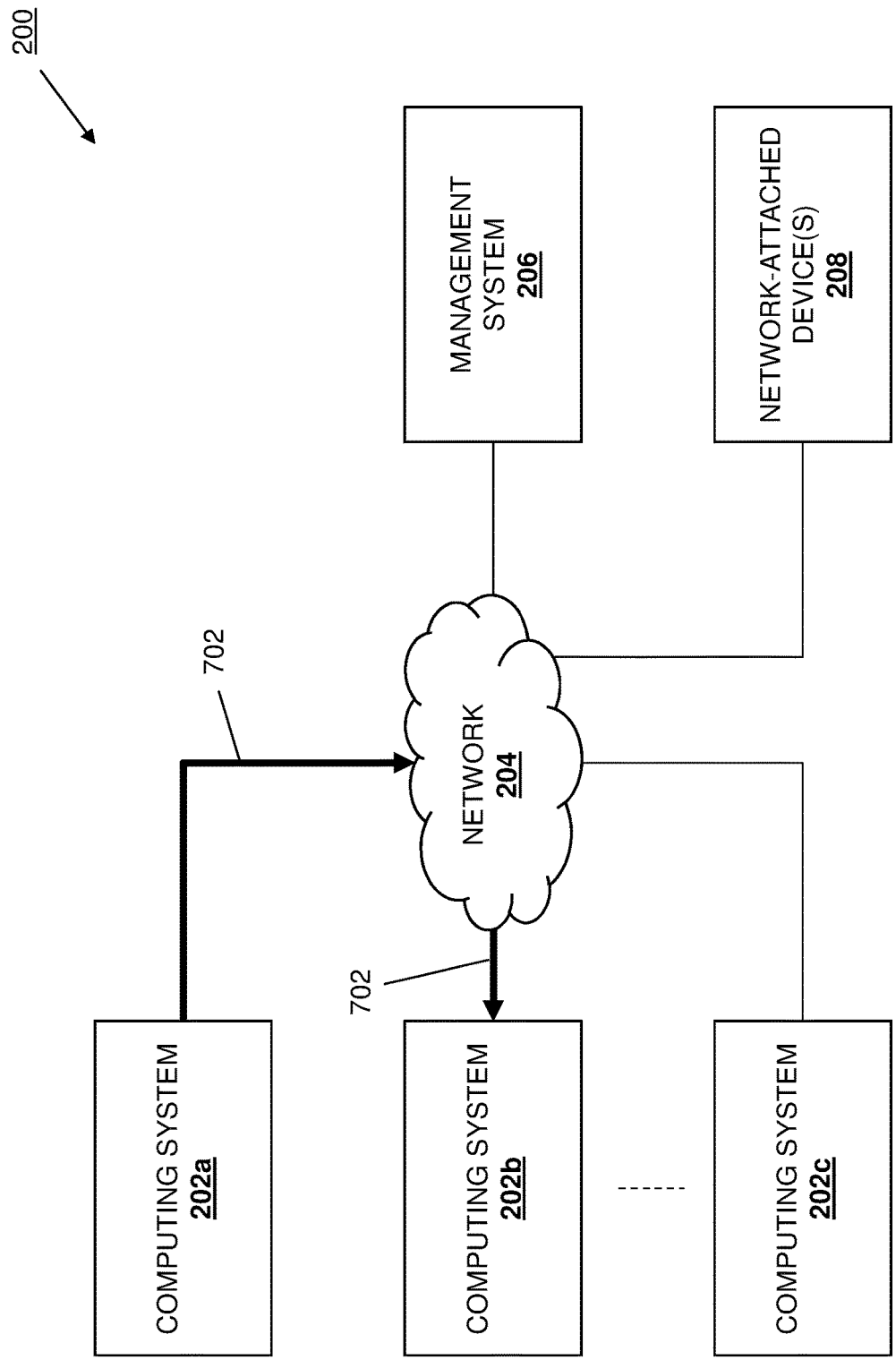
FIG. 7G is a schematic view illustrating an embodiment of the networked system of FIG. 2 operating during the method of FIG. 5.

For example, with reference to FIG. 7G, the SCP subsystem 304/400 in the computing system 202a/300 may transmit the device access configuration communications via the network 204 and to the computing system 202b as part of the remote device access configuration operations 702, and those device access configuration communications may include any of the device access configuration communications discussed above as being transmitted as part of the remote device access configuration operations 700, which one of skill in the art in possession of the present disclosure will appreciate may be utilized by the SCP subsystem 304 and/or the BMC subsystem 306 in the computing system 202b in order to allow access by the central processing subsystem 310 in the computing system 202a/300 to components/devices and/or component/device functionality in the computing system 202b that will be utilized by the central processing subsystem 310 in the computing system 202a/300 in providing the first application(s) identified at decision block 502. However, in other embodiments, the management system 206 may communicate with the SCP subsystem 204/400 in the computing system 202b to allow remote access to its device(s) and/or device functionality for the computing system 202a, and may then communicate with the SCP subsystem 204/400 in the computing system 202a to configure it to remotely access those device(s) and/or device functionality on the computing system 202b. As such, one of skill in the art in possession of the present disclosure will appreciate that the device access configurations may be performed in a variety of manners that will fall within the scope of the present disclosure.

Thus, the SCP subsystem 304 in the computing systems 202a/300 and the SCP/BMC subsystem 400 in the computing system 202b/300 may communicate to enable access for the central processing subsystem 310 in the computing system 202a/300 to the devices and/or device functionality in the computing system 202b via the SCP/BMC subsystem 400 and the device access control subsystem 308 in the computing system 202b/300. The inventors of the present disclosure describe the use of such inter-computing system device access configuration techniques to provide expanded availability computing systems in U.S. patent application Ser. No. 17/082,519, filed on Oct. 28, 2020, the disclosure of which is incorporate by reference herein in its entirety. Furthermore, while not explicitly illustrated or described, one of skill in the art in possession of the present disclosure will appreciate that access by the central processing subsystem 310 in the computing system 202a/300 to devices and/or device functionality in the computing system 202c may be allowed in a similar manner as described above for the computing system 202b while remaining within the scope of the present disclosure as well.

In another example, with reference to FIG. 7H, the SCP subsystem 304/400 in the computing system 202a/300 may transmit the device access configuration communications via the network 204 and to the network-attached device(s) 208 as part of the remote device access configuration operations 702, and those device access configuration communications may include any of the device access configuration communications discussed above as being transmitted as part of the remote device access configuration operations 700, which one of skill in the art in possession of the present disclosure will appreciate may be utilized in order to allow access by the central processing subsystem 310 in the computing system 202a/300 to network-attached device(s) 208 and/or network-attached device functionality that will be utilized by the central processing subsystem 310 in the computing system 202a/300 in providing the first application(s) identified at decision block 502. However, similarly as discussed above, the management system 206 may communicate with the SCP subsystem 204/400 in the computing system 202b to allow remote access to its device(s) and/or device functionality for the computing system 202a, and may then communicate with the SCP subsystem 204/400 in the computing system 202a to configure it to remotely access those device(s) and/or device functionality on the computing system 202b. As such, one of skill in the art in possession of the present disclosure will appreciate that the device access configurations may be performed in a variety of manners that will fall within the scope of the present disclosure.

Figure 8A:
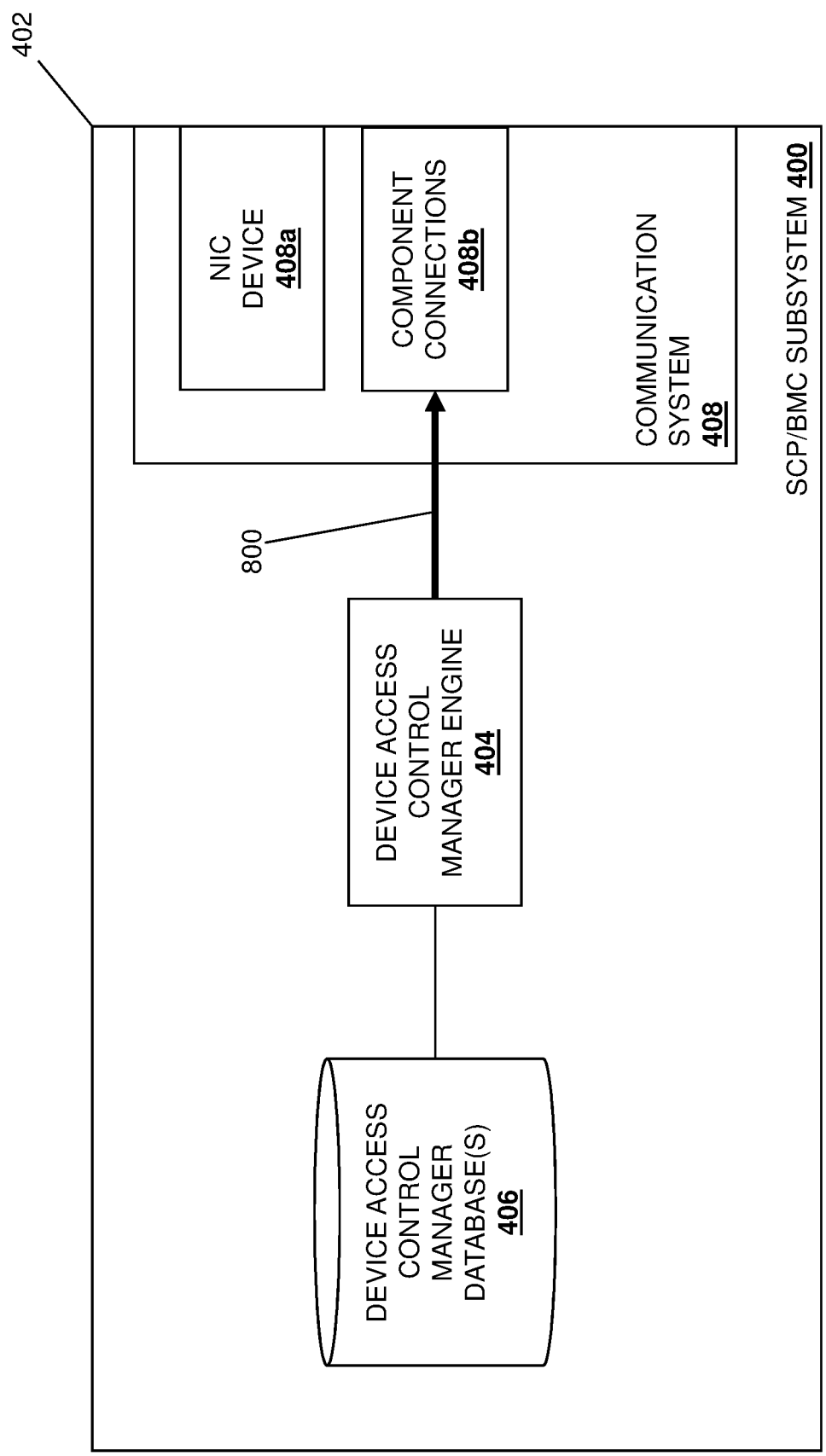
FIG. 8A is a schematic view illustrating an embodiment of the BMC subsystem of FIG. 4 operating during the method of FIG. 5.

However, in other embodiments of block 504, the BMC subsystem 306/400 in the computing system 202a/300 may operate to configure the central processing system 310 to provide an application, or configure the computing system 202a/300 to provide the central processing subsystem 310 in the computing system 202a/300 access to one or more devices and/or device functionality in the computing system 202a/300 to provide the application. For example, with reference to FIG. 8A, at block 504 the device access control manager engine 404 in the BMC subsystem 306/400 in the computing system 202a/300 may perform "local" device access configuration operations 800 that may include generating and transmitting device access configuration communications via the component connections 408a in the communication system 408. As will be appreciated by one of skill in the art in possession of the present disclosure, the device access control manager engine 404 in the BMC subsystem 306/400 in the computing system 202a/300 may perform a variety of "local" access configuration operations to configure the central processing system 310 to provide an application, or configure the computing system 202a/300 to provide the central processing subsystem 310 in the computing system 202a/300 access to one or more devices and/or device functionality in the computing system 202a/300 to provide the application, a few specific examples of which are illustrated and discussed below.

Figure 8B:
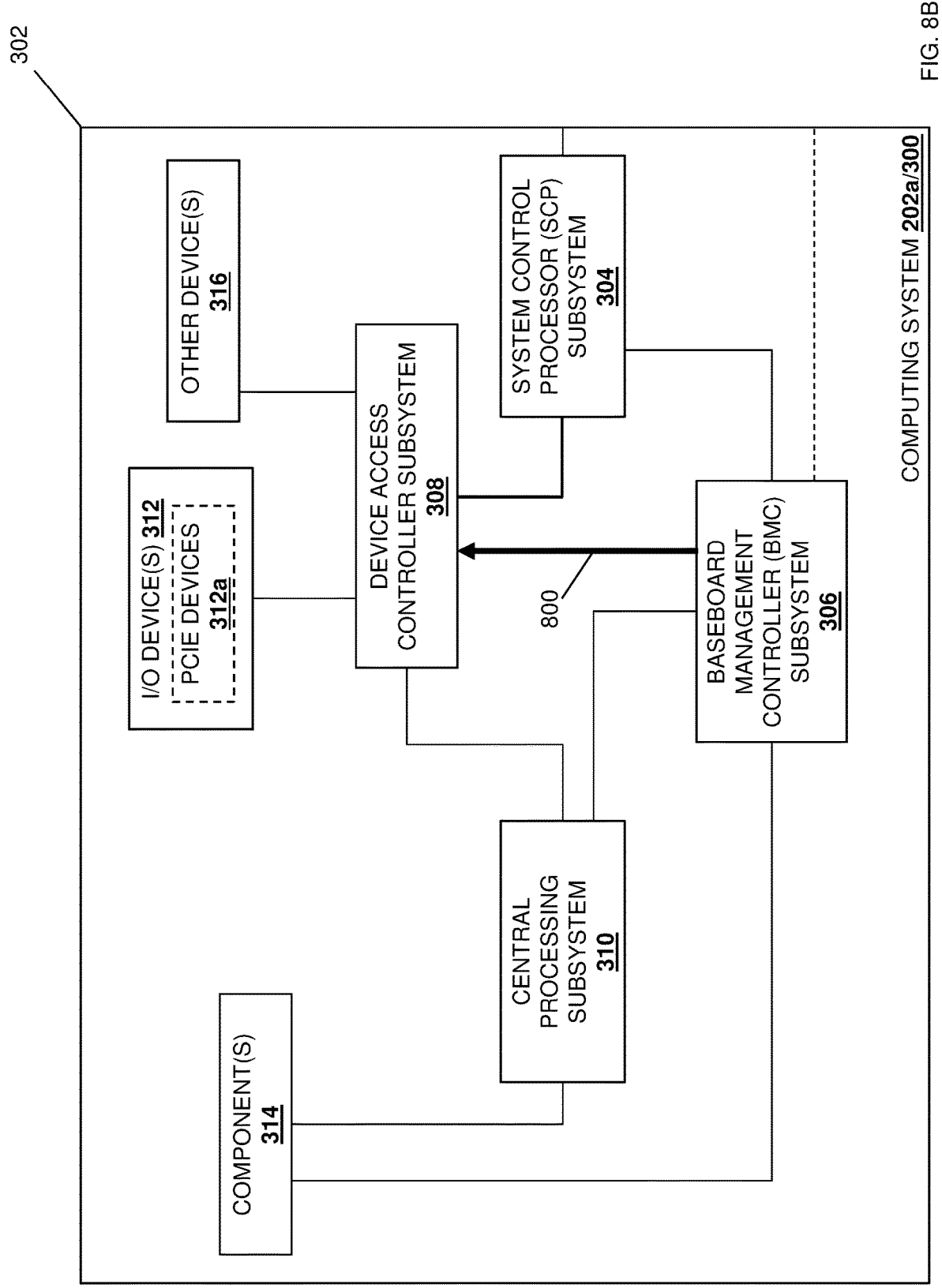
FIG. 8B is a schematic view illustrating an embodiment of the computing system of FIG. 3 operating during the method of FIG. 5.

For example, with reference to FIG. 8B, the BMC subsystem 306/400 in the computing system 202a/300 may transmit the device access configuration communications to the device access controller subsystem 308 as part of the local device access configuration operations 800, and those device access configuration communications may identify configuration information for communication technologies such a fabric switches (e.g., PCIe configuration information for PCIe switches) via a PCIe bus, a Universal Serial Bus (USB), a System Management Bus (SMBUS), an Inter- Integrated Circuit (I2C) bus, a serial port, an Ethernet port, and/or other communication techniques known in the art. Furthermore, one of skill in the art in possession of the present disclosure will appreciate that device access configuration communications may include any other commands, instructions, or other communications for configuring a fabric switch device or other device access controller subsystem to provide the central processing subsystem 310 in the computing system 202a/300 access to the I/O device(s) 312, PCIe device(s) 312a, other device(s) 316, and/or network-attached device(s) 208 (i.e., via the SCP subsystem 304) that will be utilized by the central processing subsystem 310 in providing the first application(s) identified at decision block 502.

In another example, with reference to FIG. 8C, the BMC subsystem 306/400 in the computing system 202a/300 may transmit the device access configuration communications to the central processing subsystem 310 via the device access controller subsystem 308 as part of the device access configuration operations 800, and those device access configuration communications may include Basic Input/Output System (BIOS) configuration communications (e.g., by enabling/disabling BIOS configuration settings that control device access via direct writes to a BIOS configuration memory subsystem), and/or any other commands, instructions, or other communications that one of skill in the art in possession of the present disclosure would recognize as configuring a central processing subsystem to access to the I/O device(s) 312, PCIe device(s) 312a, other device(s) 316, and/or network-attached device(s) 208 (i.e., via the SCP subsystem 304) that will be utilized by the central processing subsystem 310 in providing the first application(s) identified at decision block 502. As such, one of skill in the art in possession of the present disclosure will recognize that BIOS configurations may be performed during boot operations for the computing system 202a/300 to configure the central processing system 310 to provide the first application(s), or enable access by the central processing subsystem 310 to one or more devices and/or device functionality in the computing system 202a/300 for use in providing the first application(s) and, in some examples, BIOS configurations may be performed to disable access by the central processing subsystem 310 to those devices and/or device functionality in the computing system 202a/300 (i.e., when those devices and/or device functionality are not needed in providing the first application(s), the use of those devices and/or device functionality is associated with the accrual of licensing fees, those devices and/or device functionality present security issues, those devices are operating with unvalidated firmware, those devices store sensitive data, etc.).

Figure 8D:
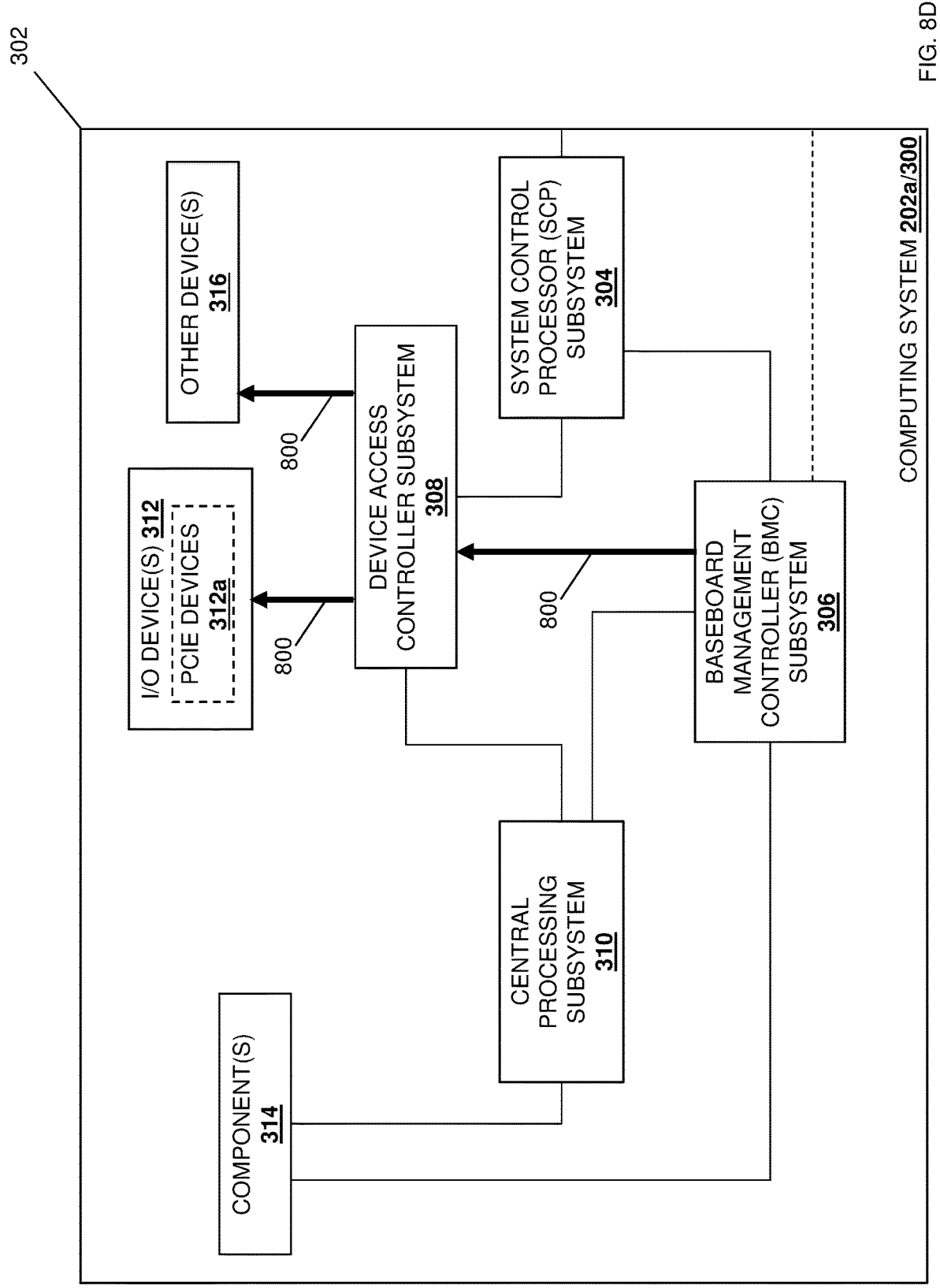
FIG. 8D is a schematic view illustrating an embodiment of the computing system of FIG. 3 operating during the method of FIG. 5.

In another example, with reference to FIG. 8D, the BMC subsystem 306/400 in the computing system 202a/300 may transmit the device access configuration communications to the I/O device(s) 312, PCIe device(s) 312a, and/or other device(s) 316 via the device access controller subsystem 308 as part of the device access configuration operations 800, and those device access configuration communications may include device configuration communications (e.g., Self-Encrypting Drive (SED) lock/unlock communications to prevent/allow access to a storage device, instructions to disable or enable access to particular portions of a memory device or storage device, etc.), and/or any other commands, instructions, or other communications that one of skill in the art in possession of the present disclosure would recognize as configuring a device to allow access by the central processing subsystem to the I/O device(s) 312, PCIe device(s) 312a, and/or other device(s) 316 that will be utilized by the central processing subsystem 310 in providing the first application(s) identified at decision block 502. As will be appreciated by one of skill in the art in possession of the present disclosure, while the device access controller subsystem 308 is described as being used to transmit the device access configuration communications to the I/O device(s) 312, PCIe device(s) 312a, other device(s) 316, other communication paths (e.g., SMBUS, 120, etc.) may be utilized to do so while remaining within the scope of the present disclosure as well. As such, one of skill in the art in possession of the present disclosure will recognize that device configurations may be performed to unlock devices and enable access by the central processing subsystem 310 to those devices and/or device functionality in the computing system 202a/300 for use in providing the first application(s) and, in some examples, device configurations may be performed to lock devices and disable access by the central processing subsystem 310 to those devices and/or device functionality in the computing system 202a/300 (i.e., when those devices and/or device functionality are not needed in providing the first application(s), the use of those devices and/or device functionality is associated with the accrual of licensing fees, those devices and/or device functionality present security issues, those devices are operating with unvalidated firmware, those devices store sensitive data, etc.).

Figure 8E:
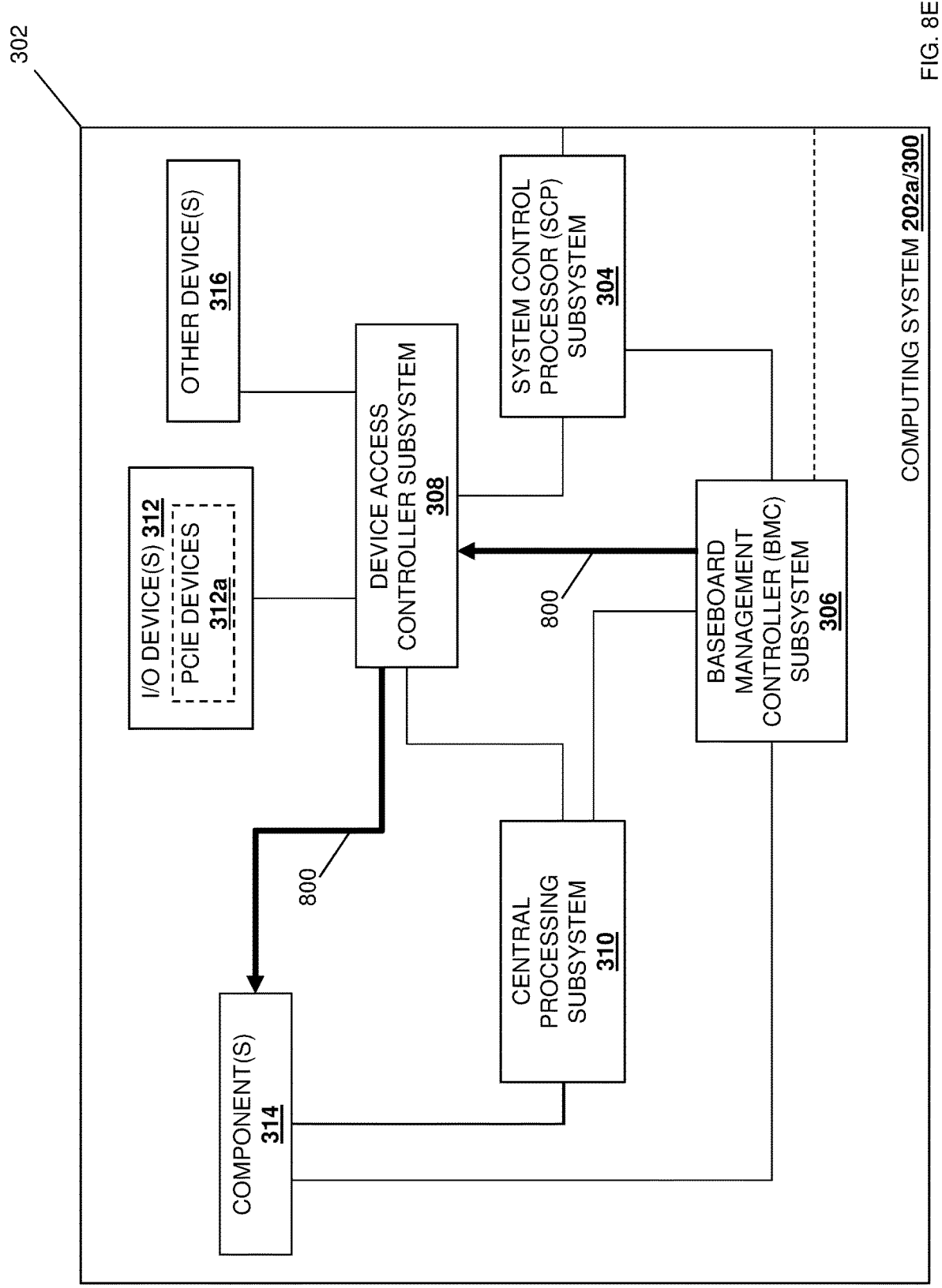
FIG. 8E is a schematic view illustrating an embodiment of the computing system of FIG. 3 operating during the method of FIG. 5.

In another example, with reference to FIG. 8E, the BMC subsystem 306/400 in the computing system 202a/300 may transmit the device access configuration communications to the component(s) 314 via the device access controller subsystem 308 as part of the device access configuration operations 800, and those device access configuration communications may include component configuration communications (e.g., Self-Encrypting Drive (SED) lock or unlock communicates to allow or disable access to a storage device, instructions to disable or enable access to particular portions of a memory device or storage device, etc.), and/or any other commands, instructions, or other communications that one of skill in the art in possession of the present disclosure would recognize as configuring a component to allow access by the central processing subsystem to the component(s) 314 that will be utilized by the central processing subsystem 310 in providing the first application(s) identified at decision block 502.

As will be appreciated by one of skill in the art in possession of the present disclosure, the device access configuration operations 800 between the device access controller subsystem 308 and the component(s) 314 may be performed without the central processing subsystem 310 running or otherwise participating in the transmission, and thus may utilize the SMBUS communication channels, I2C communication channels, and/or other signaling paths that are available between the device access controller subsystem 308 and the component(s) 314. As such, one of skill in the art in possession of the present disclosure will recognize that component configurations may be performed to unlock components and enable access by the central processing subsystem 310 to those component and/or component functionality in the computing system 202a/300 for use in providing the first application(s) and, in some examples, component configurations may be performed to lock components and disable access by the central processing subsystem 310 to those components and/or component functionality in the computing system 202a/300 (i.e., when those components and/or component functionality are not needed in providing the first application(s), the use of those components and/or component functionality is associated with the accrual of licensing fees, those components and/or component functionality present security issues, those components are operating with unvalidated firmware, those components store sensitive data, etc.).

However, while several specific "local" device access configuration operations 800 have been described to configure the central processing system 310 to provide an application, or configure the computing system 202a/300 to provide the central processing subsystem 310 in the computing system 202a/300 access to one or more devices and/or device functionality in the computing system 202a/300 to provide an application, other local device access configuration operations will fall within the scope of the present disclosure as well. For example, the BMC subsystem 306/400 in the computing system 202a/300 may transmit the device access configuration communications to a power subsystem (not illustrated) in the computing system 202a/300 as part of the device access configuration operations 800, and those device access configuration communications may include power configuration communications (e.g., power control configurations to enable power to devices and/or device functionality in the computing system 202a/300), and/or any other commands, instructions, or other communications that one of skill in the art in possession of the present disclosure would recognize as configuring power to a device and/or device functionality to allow access by the central processing subsystem to the I/O device(s) 312, PCIe device(s) 312a, component(s) 314, and/or other device(s) 316 that will be utilized by the central processing subsystem 310 in providing the first application(s) identified at decision block 502. In a specific example of the use of power configuration to control device functionality access, power may be enabled and/or disabled to processor sockets in the central processing subsystem in order to enable/disable access to different processors when providing the application, and similar techniques may be utilized to enable disable access to different processing cores in a processor, or a hardware accelerator device associated with a processor, if such power configuration functionality is present in that processor.

As will be appreciated by one of skill in the art in possession of the present disclosure, some computing systems may include separate power controls for individual device/components slots in that computing system (e.g., power control circuitry in a motherboard), and those separate power controls may be utilized to power/prevent power to any device/component and/or device/component functionality in the computing system. Furthermore, some storage devices (e.g., SATA storage devices, SAS storage devices, NVMe storage devices, etc.) may include "power disable" controls (e.g., power disable pins on their connectors) that may be utilized to power/prevent power to any device/component and/or device/component functionality in the computing system. As such, one of skill in the art in possession of the present disclosure will recognize that power configurations may be performed to enable power to devices and/or device functionality and thus enable access by the central processing subsystem 310 to those devices and/or device functionality in the computing system 202a/300 for use in providing the first application(s) and, in some examples, power configurations may be performed to disable power to devices and/or device functionality and thus disable access by the central processing subsystem 310 to those devices and/or device functionality in the computing system 202a/300 (i.e., when those devices and/or device functionality are not needed in providing the first application(s), the use of those devices and/or device functionality is associated with the accrual of licensing fees, those devices and/or device functionality present security issues, those devices are operating with unvalidated firmware, those devices store sensitive data, etc.).

Figure 8F:
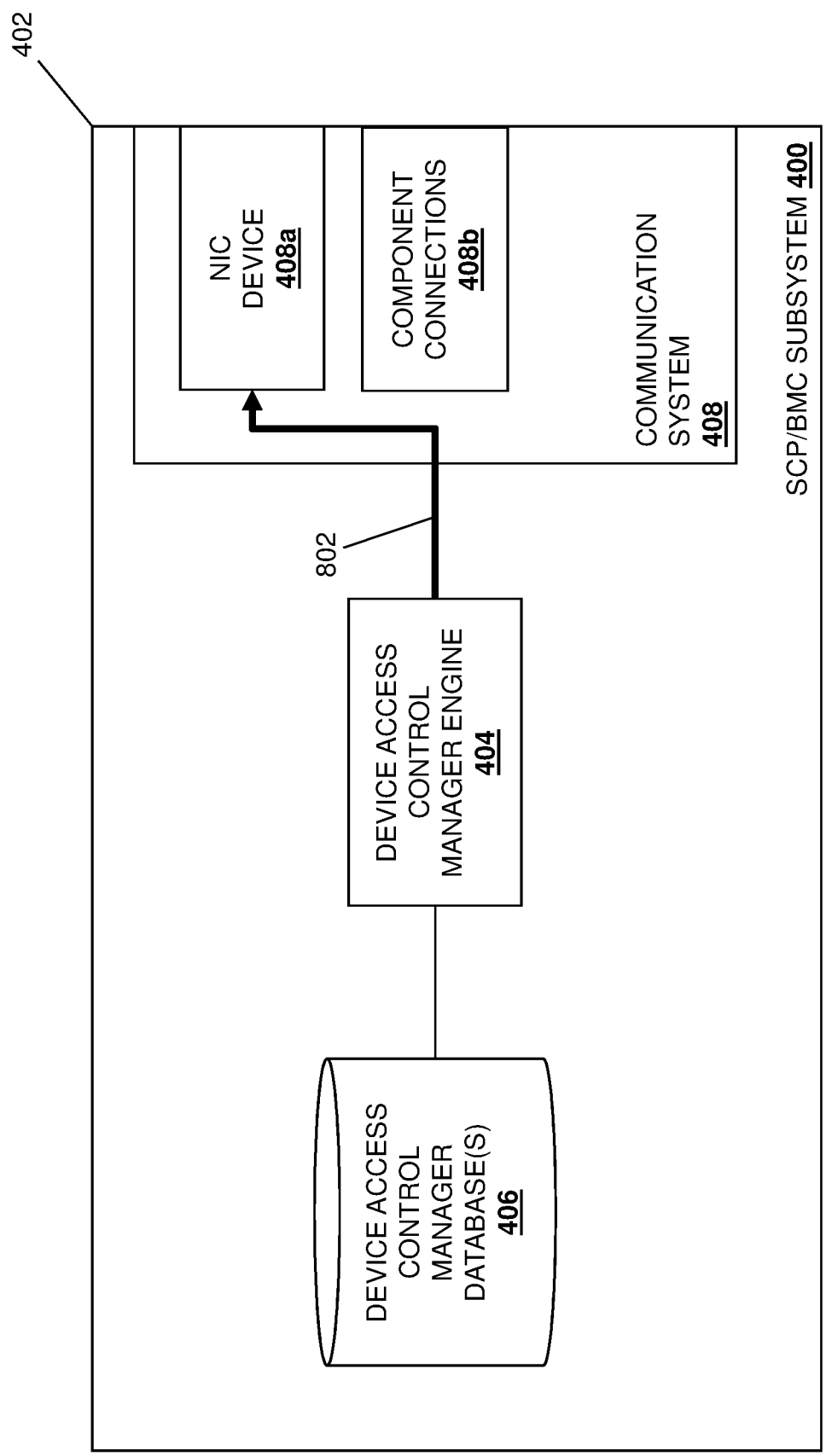
FIG. 8F is a schematic view illustrating an embodiment of the BMC subsystem of FIG. 4 operating during the method of FIG. 5.

In some embodiments, with reference to FIG. 8F, at block 504 the device access control manager engine 404 in the BMC subsystem 306/400 in the computing system 202a/300 may perform "remote" device access configuration operations 802 that may include generating and transmitting device access configuration communications via the NIC device 408a in the communication system 408. As will be appreciated by one of skill in the art in possession of the present disclosure, the device access control manager engine 404 in the BMC subsystem 306/400 in the computing system 202a/300 may perform a variety of access configuration operations to configure access for the central processing subsystem 310 in the computing system 202a/300 to one or more devices and/or device functionality via the network 204, a few specific examples of which are illustrated and discussed below.

Figure 8G:
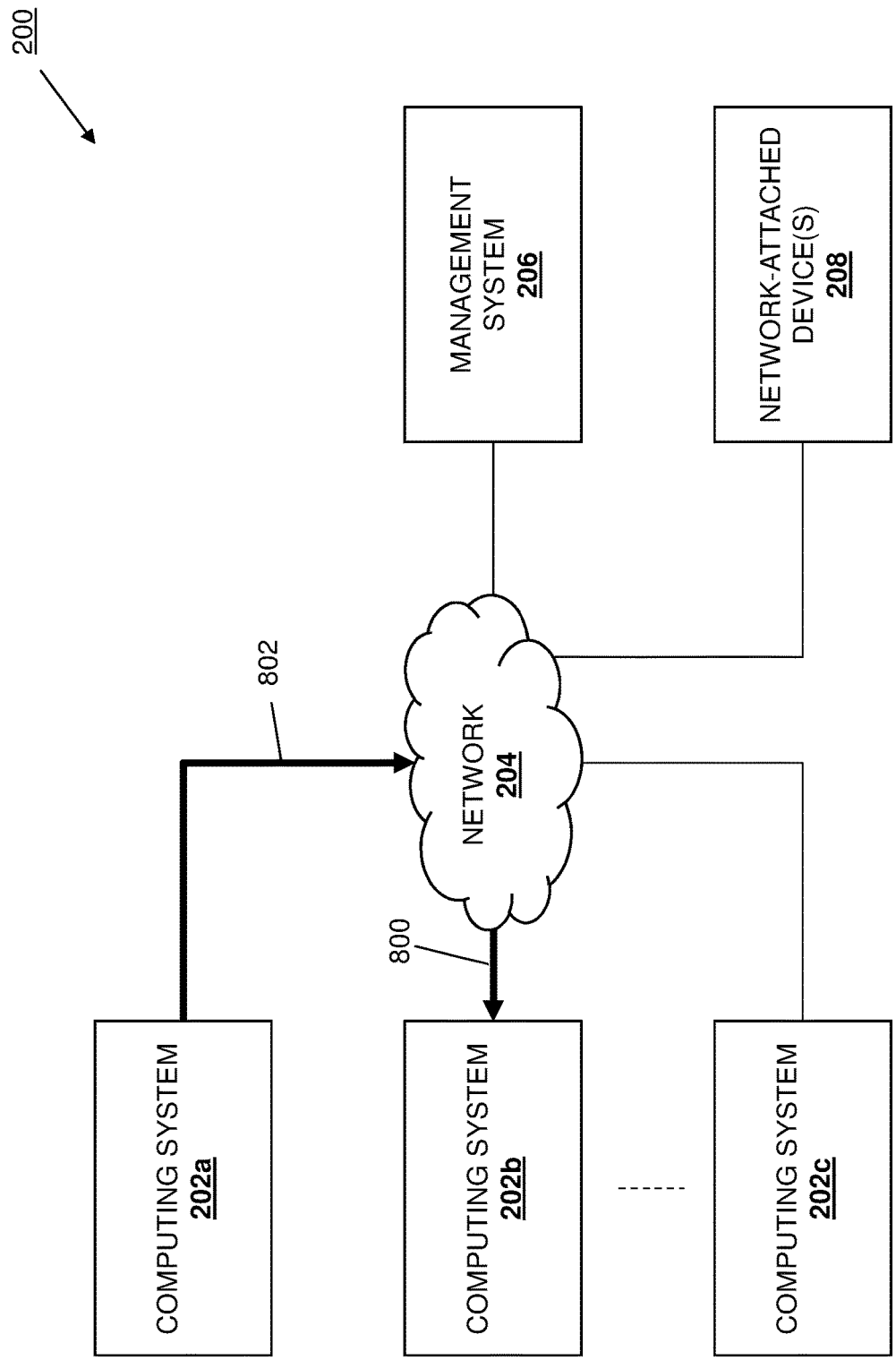
FIG. 8G is a schematic view illustrating an embodiment of the networked system of FIG. 2 operating during the method of FIG. 5.

For example, with reference to FIG. 8G, the BMC subsystem 306/400 in the computing system 202a/300 may transmit the device access configuration communications via the network 204 and to the computing system 202b as part of the remote device access configuration operations 802, and those device access configuration communications may include any of the device access configuration communications discussed above as being transmitted as part of the remote device access configuration operations 800, which one of skill in the art in possession of the present disclosure will appreciate may be utilized by the SCP subsystem 304 and/or the BMC subsystem 306 in the computing system 202b in order to allow access by the central processing subsystem 310 in the computing system 202a/300 to components/devices and/or component/device functionality in the computing system 202b that will be utilized by the central processing subsystem 310 in the computing system 202a/300 in providing the first application(s) identified at decision block 502. However, in other embodiments, the management system 206 may communicate with the SCP subsystem 204/400 in the computing system 202b to allow remote access to its device(s) and/or device functionality for the computing system 202a, and may then communicate with the SCP subsystem 204/400 in the computing system 202a to configure it to remotely access those device(s) and/or device functionality on the computing system 202b. As such, one of skill in the art in possession of the present disclosure will appreciate that the device access configurations may be performed in a variety of manners that will fall within the scope of the present disclosure.

Thus, the BMC subsystem 306 in the computing system 202a/300 and the SCP/BMC subsystem in the computing system 202b/300 may communicate to enable access for the central processing subsystem 310 in the computing system 202a/300 to the devices and/or device functionality in the computing system 202b via the SCP/BMC subsystem 400 and the device access control subsystem 308 in the computing system 202b/300. The inventors of the present disclosure describe the use of such inter-computing system device access configuration techniques to provide expanded availability computing systems in U.S. patent application Ser. No. 17/082,519, filed on Oct. 28, 2020, the disclosure of which is incorporate by reference herein in its entirety. Furthermore, while not explicitly illustrated or described, one of skill in the art in possession of the present disclosure will appreciate that access by the central processing subsystem 310 in the computing system 202a/300 to devices and/or device functionality in the computing system 202c may be allowed in a similar manner as described above for the computing system 202b while remaining within the scope of the present disclosure as well.

Figure 8H:
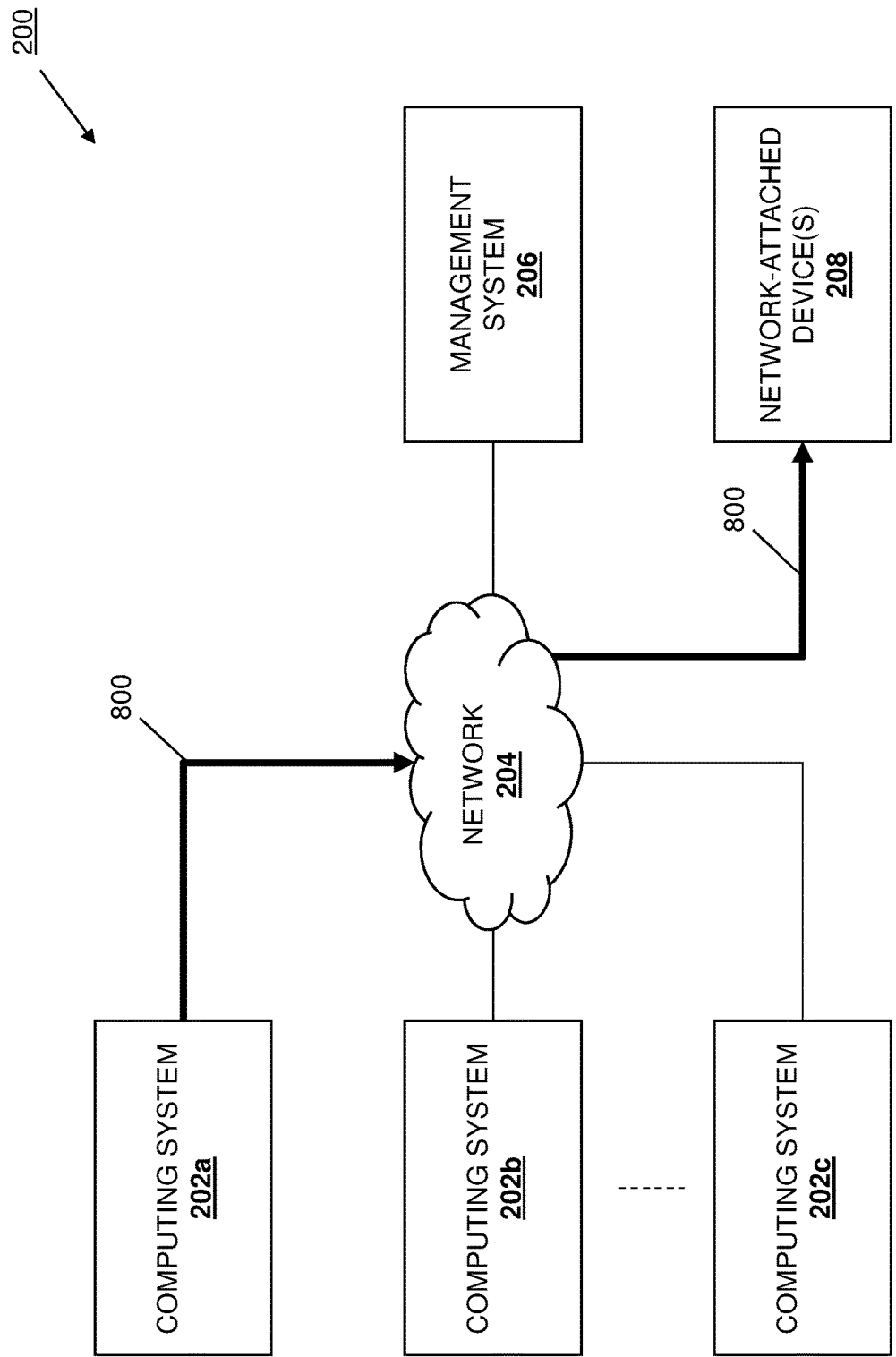
FIG. 8H is a schematic view illustrating an embodiment of the networked system of FIG. 2 operating during the method of FIG. 5.

In another example, with reference to FIG. 8H, the BMC subsystem 306/400 in the computing system 202a/300 may transmit the device access configuration communications via the network 204 and to the network-attached device(s) 208 as part of the remote device access configuration operations 802, and those device access configuration communications may include any of the device access configuration communications discussed above as being transmitted as part of the remote device access configuration operations 800, which one of skill in the art in possession of the present disclosure will appreciate may be utilized in order to allow access by the central processing subsystem 310 in the computing system 202a/300 to network-attached device(s) 208 and/or network-attached device functionality that will be utilized by the central processing subsystem 310 in the computing system 202a/300 in providing the first application(s) identified at decision block 502. However, similarly as discussed above, the management system 206 may communicate with the SCP subsystem 204/400 in the computing system 202b to configure allow remote access to its device(s) and/or device functionality for the computing system 202a, and may then communicate with the SCP subsystem 204/400 in the computing system 202a to configure it to remotely access those device(s) and/or device functionality on the computing system 202b. As such, one of skill in the art in possession of the present disclosure will appreciate that the device access configurations may be performed in a variety of manners that will fall within the scope of the present disclosure.

Thus, at block 504, a variety of configuration operations may be performed by the SCP subsystem 304 and/or the BMC subsystem 306 to provide the central processing subsystem 310 in the computing system 202a/300 access to a first subset of devices and/or device functionality in the computing system 202a/300 (and/or devices/device functionality connected to the computing system 202a/300 via the network 204) that will be utilized by the central processing subsystem 310 in providing the first application(s). As such, central processing system configurations and/or access for the central processing subsystem 310 in the computing system 202a/300 to devices and/or device functionality in the computing system 202a/300 that are directly connected to the central processing subsystem 310 may be provided via BIOS configurations for the central processing subsystem 310 in the computing system 202a/300, power configurations (e.g., enabling power) associated with those devices and/or device functionality, device configurations (e.g., unlocking) associated with those devices and/or device functionality, and/or other access configurations that would be apparent to one of skill in the art in possession of the present disclosure.

Similarly, access for the central processing subsystem 310 in the computing system 202a/300 to devices and/or device functionality in the computing system 202a/300 that are connected to the central processing subsystem 310 via the device access control subsystem 308 may be provided via BIOS configurations for the central processing subsystem 310 in the computing system 202a/300, power configurations (e.g., enabling power) associated with those devices and/or device functionality, device configurations (e.g., unlocking) associated with those devices and/or device functionality, device access controller configurations (e.g., fabric switch configurations) for the device access controller subsystem 308, and/or other access configurations that would be apparent to one of skill in the art in possession of the present disclosure. Similarly, access for the central processing subsystem 310 in the computing system 202a/300 to devices and/or device functionality that are connected to the computing system 202a/300 via the network 204 may be provided via device configurations (e.g., unlocking) associated with those devices and/or device functionality, device access controller configurations (e.g., fabric switch configurations) for the device access controller subsystem 308, and/or other access configurations that would be apparent to one of skill in the art in possession of the present disclosure.

Figure 9A:
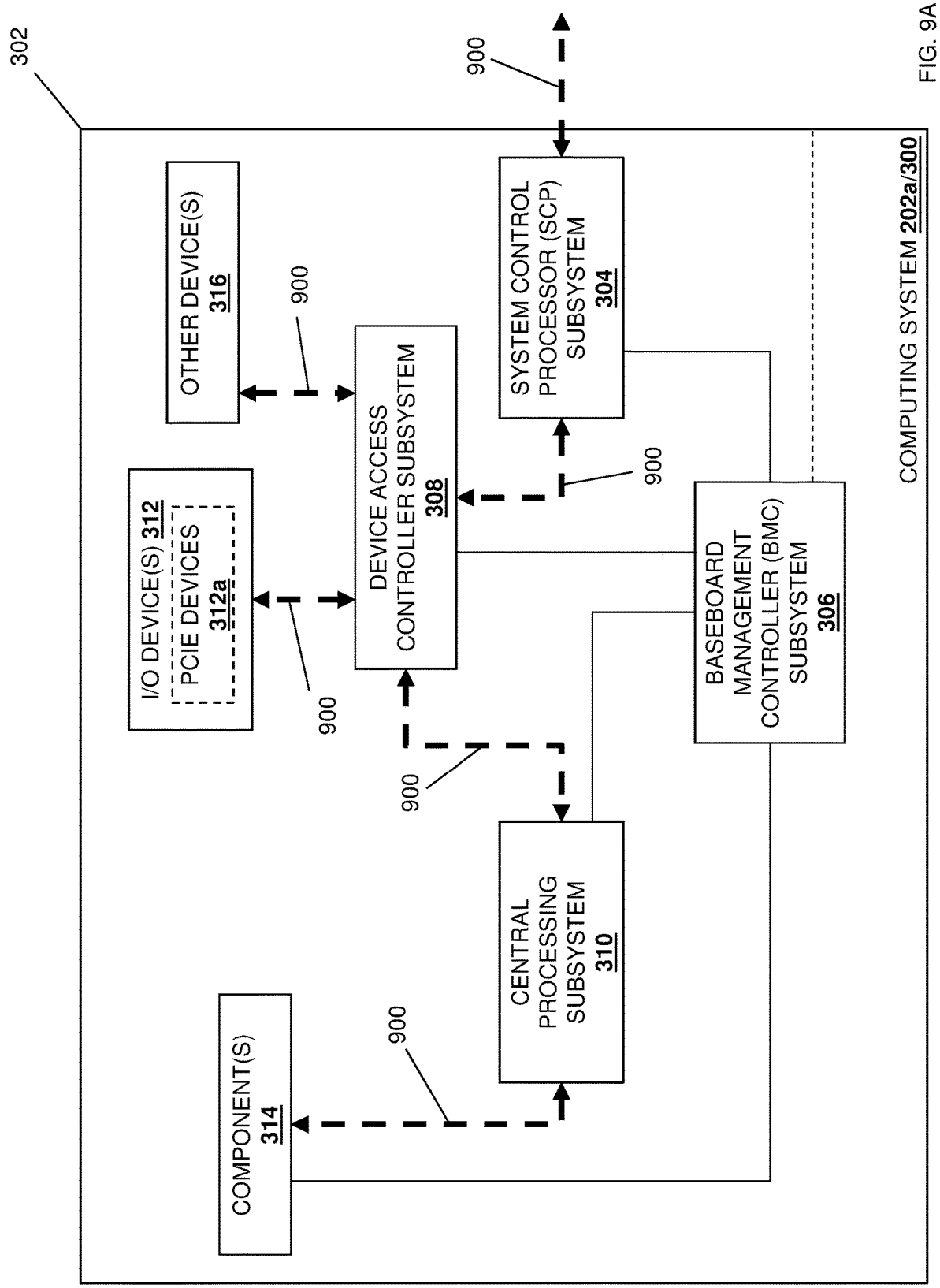
FIG. 9A is a schematic view illustrating an embodiment of the computing system of FIG. 3 operating during the method of FIG. 5.
Figure 9B:
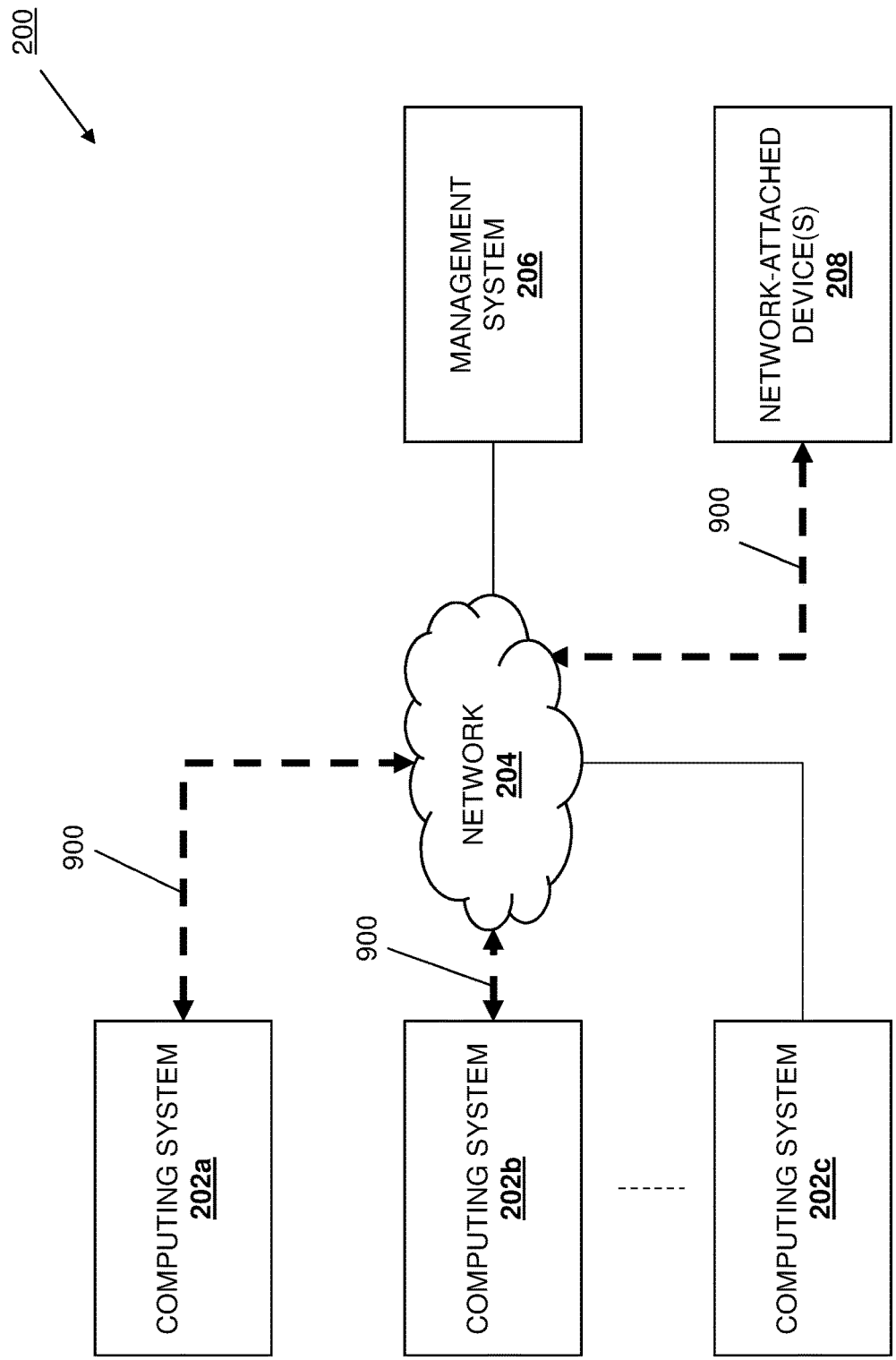
FIG. 9B is a schematic view illustrating an embodiment of the networked system of FIG. 2 operating during the method of FIG. 5.

The method 500 then proceeds to block 506 where the central processing subsystem in the first computing system provides the one or more first applications using the one or more devices in the first computing subsystem. With reference to FIGS. 9A and 9B, in an embodiment of block 506, the central processing subsystem 310 in the computing system 202a/300 may perform application provisioning operations 900 that may include, for example, exchanging first application control communications with any devices for which it was provided access in order to provide the first application(s). As such (and as indicated by the dashed/bolded arrows in FIGS. 9A and 9B), the central processing subsystem 310 in the computing system 202a/300 may provide the first application(s) at block 506 by utilizing the central processing functionality enabled in the central processing system 310, and/or exchanging first application control communications with any of the component(s) 314 to which it was provided access; with any of the I/O device(s) 312, PCIe device(s) 312a, and/or other device(s) 316 to which is was provided access via the device access controller subsystem 308; with any of the devices in the second computing system 202b to which is was provided access via the device access controller subsystem 308, SCP subsystem 304, and the network 204; and with any of the network attached device(s) 208 to which is was provided access via the device access controller subsystem 308, SCP subsystem 304, and the network 204.

The method 500 then proceeds to decision block 508 where it is determined whether one or more additional applications have been identified for provisioning by another computing system. In an embodiment, at decision block 508, the device access control manager engine 404 in either or both of the SCP subsystem 304/400 and/or BMC subsystem 306/400 in the computing system 202a/300 may operate to determine whether additional application(s) have been identified for provisioning by the computing system 202a/300. For example, at decision block 508, the device access control manager engine 404 in either or both of the SCP subsystem 304/400 and/or BMC subsystem 306/400 in the computing system 202a/300 may operate to determine whether the management system 206 has identified additional application(s) for provisioning by the computing system 202a/300, although one of skill in the art in possession of the present disclosure will recognize that application(s) for provisioning by a computing system may be identified in a variety of manners that will fall within the scope of the present disclosure as well.

Similarly as discussed above for decision block 502, in some examples, the identification of additional application(s) for provisioning by the computing system 202a/300 at decision block 508 may be performed prior to or during a computing system initialization process (e.g., a boot process) for the computing system 202a/300, while in other examples the identification of application(s) for provisioning by the computing system 202a/300 at block 508 may be performed during runtime of the computing system 202a/300. As such, the identification of the first application(s) at decision block 502 and the identification of the additional applications at decision block 508 may occur at the same time, or at different times, while remaining within the scope of the present disclosure. If, at decision block 508, it is determined that one or more first applications have not been identified for provisioning by the first computing system, the method 500 returns to decision block 506. As such, the method 500 may loop such that the central processing subsystem 310 in the computing system 202a/300 provides the first application(s) as long as no additional application(s) are identified for provisioning by the computing system 202a/300.

If, at decision block 508, it is determined that one or more additional applications have been identified for provisioning by another computing system, the method 500 proceeds to block 510 where the device access control manager subsystem configures the first computing system to provide the other computing system access to one or more devices and/or device functionality in the first computing system. In an embodiment, at decision block 508, the management system 206, the SCP subsystem 304, and/or the BMC subsystem 306 may operate in substantially the same manner as discussed above with reference to FIGS. 6A-6F to identify the additional application(s) for provisioning by the computing system 202b in the examples below. Furthermore, in some embodiments of block 510, the SCP subsystem 304 may operate in substantially the same manner as discussed above with reference to FIGS. 7A-7H to configure the computing system 202a/300 to allow the computing system 202b access to devices and/or device functionality in the computing system 202a/300, while in other embodiments of block 510 the BMC subsystem 306 may operate in substantially the same manner as discussed above with reference to FIGS. 8A-8H to configure the computing system 202a/300 to allow the computing system 202b access to devices and/or device functionality in the computing system 202a/300.

Thus, at block 510, a variety of configuration operations may be performed by the SCP subsystem 304 and or the BMC subsystem 306 to provide the computing system 202b (e.g., the central processing subsystem 310 in the computing system 202b/300) access to a second subset of devices and/or device functionality in the computing system 202a/300 that will be utilized by the computing system 202b in providing second application(s). As such, access for the central processing subsystem 310 in the computing system 202b/300 to devices and/or device functionality in the computing system 202a/300 that are connected to the central processing subsystem 310 in the computing system 202b/300 via the network 204, the SCP subsystem 304 in the computing system 202a/300, and the device access control subsystem 308 in the computing system 202a/300, may be provided via BIOS configurations for the central processing subsystem 310 in the computing system 202b/300, power configurations (e.g., enabling power) associated with those devices and/or device functionality, device configurations (e.g., unlocking) associated with those devices and/or device functionality, device access controller configurations (e.g., fabric switch configurations) for the device access controller subsystem 308 in each of the computing systems 202a/300 and 202b/300, and/or other access configurations that would be apparent to one of skill in the art in possession of the present disclosure. For example, the inventors of the present disclosure describe the use of such inter-computing system device access configuration techniques to provide expanded availability computing systems in U.S. patent application Ser. No. 17/082,519, filed on Oct. 28, 2020, the disclosure of which is incorporate by reference herein in its entirety.

Figure 10A:
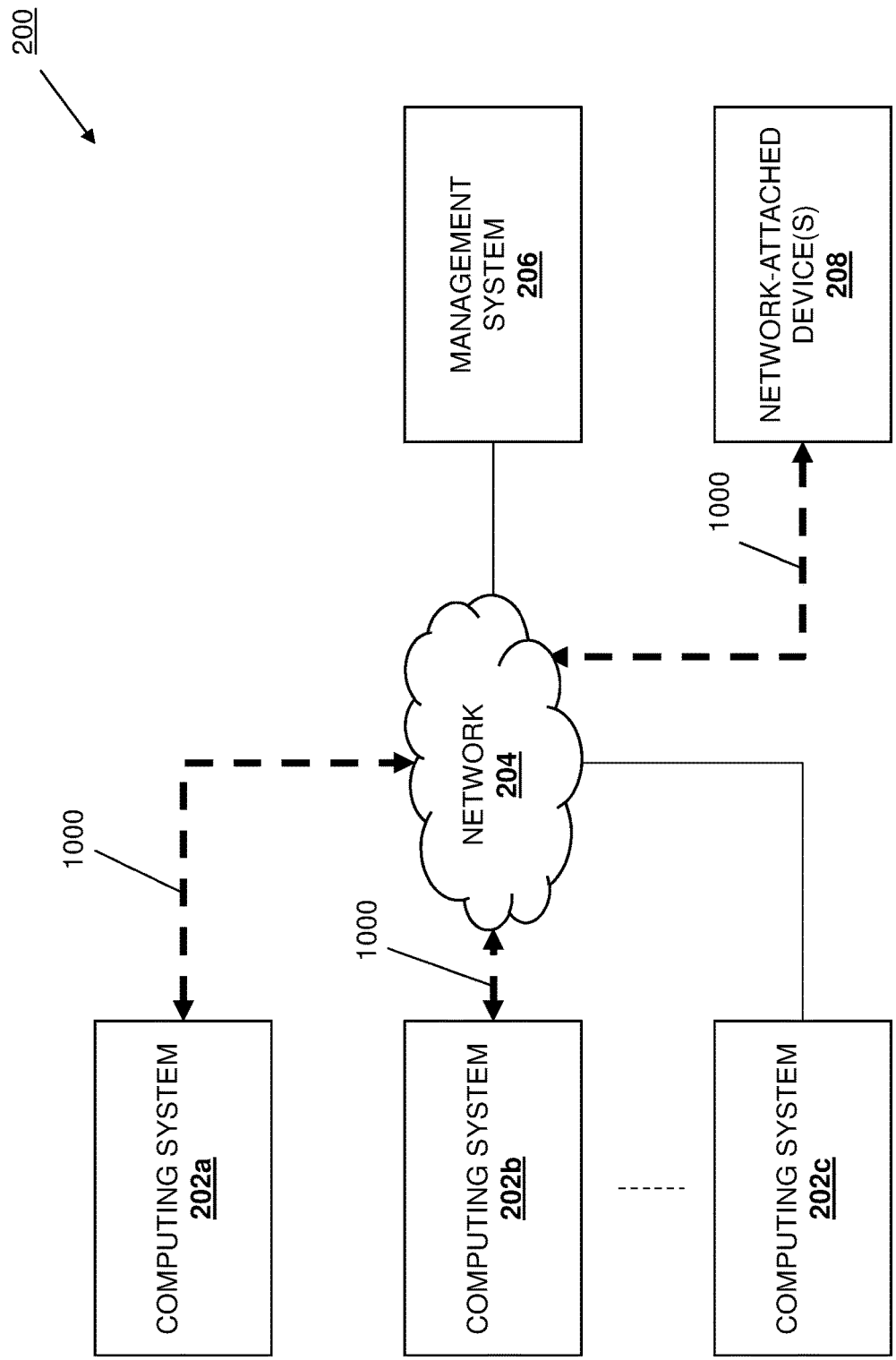
FIG. 10A is a schematic view illustrating an embodiment of the networked system of FIG. 2 operating during the method of FIG. 5.
Figure 10B:
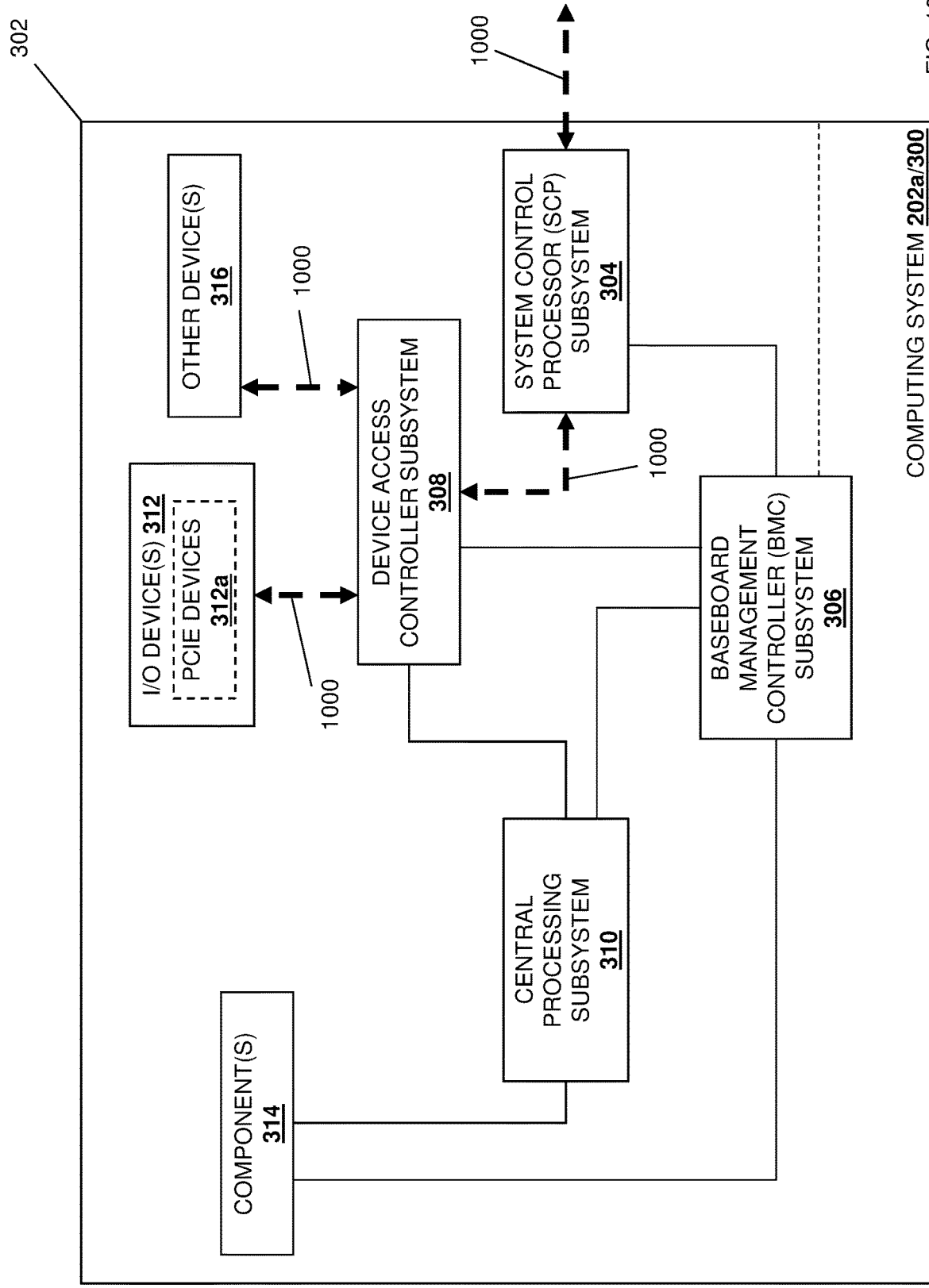
FIG. 10B is a schematic view illustrating an embodiment of the computing system of FIG. 3 operating during the method of FIG. 5.

The method 500 then proceeds to block 512 where the other computing system provides the one or more additional applications using the one or more devices in the first computing subsystem. With reference to FIGS. 10A and 10B, in an embodiment of block 512, the central processing subsystem 310 in the computing system 202b/300 may perform application provisioning operations 1000 that may include, for example, exchanging second application control communications with any devices for which it was provided access in order to provide the second application(s). As such (and as indicated by the dashed/bolded arrows in FIGS. 10A and 10B), the central processing subsystem 310 in the computing system 202b/300 may provide the second application(s) at block 506 by exchanging first application control communications via the network 204, the SCP subsystem 304 in the computing system 202a/300, and the device access controller subsystem 308 in the computing system 202a/300 with any of the I/O device(s) 312, PCIe device(s) 312a, and/or other device(s) 316 in the computing system 202a/300 to which is was provided access; and with any of the network attached device(s) 208 to which is was provided access via the network 204. Further still, on one of skill in the art in possession of the present disclosure will appreciate that the central processing subsystem 310 in the computing system 202b/300 may be configured to access other devices (e.g., in the computing system 202b, in the computing system 202c, etc.) to provide the second application(s) while remaining within the scope of the present disclosure as well.

The method 500 then returns to decision block 508. As such, the method 500 may loop such that devices and/or device functionality in the computing system 202a are utilized to provide application(s) by the central processing subsystem 310 in the computing system 202a/300, as well as other computing systems (e.g., the computing system 202b in the example above), with the method 500 configured to provide access for other computing systems to devices and/or device functionality in the computing system 202a in order to provide other applications as well. While not explicitly illustrated or described, one of skill in the art in possession of the present disclosure will appreciate how the method 500 may also provide for the completion of the performance of applications by the central processing subsystem 310 in the computing system 202a/300 as well as other computing systems (e.g., the computing system 202b in the example above), along with the disabling of access to the devices and/or device functionality in the computing system 202a that were being used to provide those applications, in order to allow those devices and/or that device functionality to be allocated for use in providing yet other applications.

While specific examples are provided above, one of skill in the art in possession of the present disclosure will recognize how a variety of access/allocation operations may be performed to enable the provisioning of applications by a central processing subsystem. For example, a first central processing subsystem in a first computing system may be provided access to a first subset of first devices and/or device functionality in the first computing system (e.g., a first Graphics Processing Unit (GPU), one or more first GPU cores, a particular first GPU processing frequency, a first GPU hardware accelerator, etc.) and second devices and/or device functionality in a second computing system (e.g., second GPUs, one or more second GPU cores, a particular second GPU processing frequency, a second GPU hardware accelerator, etc.) available via a first SCP in the first computing system) in order to provide first application(s). Furthermore, access to devices and/or device functionality in the first computing system and/or the second computing system may be disabled (e.g., via power control, device locking, etc.) to prevent a first central processing subsystem in a first computing system from accessing sensitive information stored on those devices, preventing "confusion" of the first central processing subsystem, preventing the accrual of licensing fees associated with the use of those devices and/or device functionality, preventing security issues associated with the use of those devices and/or device functionality, due to those devices operating without validated firmware, etc, and/or for a variety of other reasons that would be apparent to one of skill in the art in possession of the present disclosure.

Thus, devices and/or device functionality may be allocated to a first central processing subsystem in a first computing system during boot operations for the first computing system and according to an first application image for the first application(s) in order to allow the first central processing subsystem to provide for optimal provisioning of the first application(s), or during runtime for the first computing system in order to allow access to devices and/or device functionality in the first computing system that may have not been enabled during those boot operations (e.g., which may look like a PCIe hot plug of a PCIe device to the first central processing subsystem in the first computing system). As will be appreciated by one of skill in the art in possession of the present disclosure, the allocation/access of devices for the provisioning of application(s) may be performed based on Service Level Agreements (SLAs) in order to provide for provisioning of those application(s) based on service levels paid for by a customer. Furthermore, with regard to devices and/or device functionality associated with the use of licensing fees, a user of an application may be allowed to define a licensing fee threshold, which may be utilized to enable access to a corresponding device and/or device functionality (e.g., CPU cores, particular CPU processing frequencies, a hardware accelerator, etc.) when the accrued licensing fees are below that licensing fee threshold, and disable access to the corresponding device and/or device functionality when the accrued licensing fees are above that licensing fee threshold. Similarly, an application may be associated with a capacity threshold that may be utilized to disable access to a corresponding device and/or device functionality (e.g., storage devices or storage space provided by storage devices) when the current user capacity (e.g., users currently using the application) is below that capacity threshold, and enable access to the corresponding device and/or device functionality when the current user capacity is above that capacity threshold.

As discussed above and as will be appreciated by one of skill in the art in possession of the present disclosure, the device access techniques discussed above may be utilized to initially configure a first computing device to provide an application using a first subset of devices (e.g., in the first computing system, in a second computing system, and/or connected to the first computing system via a network) and, when the requirements of that application change, to enable that first computing device to provide that application using a second subset of devices (e.g., in the first computing system, one or more second computing systems, and/or connected to the first computing system via a network). For example, the method 500 above may be performed during initialization operations by the first computing device (e.g., prior to the initialization of the application on that first computing device) in order to enable and disable access for the first computing device to devices and/or device functionality in the first computing system, one or more second computing systems, and/or connected to the first computing system via a network, which as discussed above configures the first computing device to provide an application using a first subset of devices.

Subsequently (e.g., during runtime for the first computing device, during a subsequent initialization operation (e.g., a reboot) for the first computing device, and/or at any other time that would be apparent to one of skill in the art in possession of the present disclosure), it may be determined that the application being provided by the first computing system requires additional or fewer devices or device functionality (e.g., the application needs more or less GPU power, memory space, storage space, etc.), and the first computing system may be provided access to a second subset of devices and/or device functionality that satisfy the additional or fewer devices or device functionality required to provide the application. For example, additional device and/or device functionality requirements may be identified in response to identifying that memory space or storage space allocated for the application is relatively low, utilization of processing systems to provide the application is relatively high, and/or any other factors that would be apparent to one of skill in the art in possession of the present disclosure. As such, in a specific example, the application provisioning device/device functionality access configurations discussed above may remain across computing system initializations/boots, and if the provisioning of an application is maxing out allocated resources during computing system runtime, additional resources may be allocated for provisioning that application on a subsequent initialization/boot.

Similarly, it is determined that more efficient or otherwise more appropriate second devices and/or second device functionality is available for provisioning an application, that application may be "moved" to those second devices and/or that second device functionality by enabling access by the computing system providing that application to those second devices and/or that second device functionality, and disabling access to the first devices and/or first device functionality that was being used to provision that application. For example, the enabling and disabling of devices and/or device functionality to provide more efficient application provisioning may include determining that first memory device(s) and/or first memory space being used by a first computing system to provide an application during a first runtime operated below a speed threshold and, in response, access for the first computing system to the first memory device(s) and/or first memory space may be disabled, while access for the first computing system to second memory device(s) and/or second memory space that operate at higher speeds may be enabled and subsequently utilized by the first computing system to provide the application.

Thus, systems and methods have been described that provide for the dynamic configuration of device and/or device functionality access within a server in order to, for example, provide local access for a central processing subsystem in that server to those devices and/or device functionality, as well as remote access for a central processing system in another server to those devices and/or device functionality. For example, the device access control system of the present disclosure may include a computing system having a device access controller subsystem coupled to devices and a central processing subsystem. A device access control manager subsystem is coupled to the device access controller subsystem and operates, during initialization operations for the computing system, to identify application(s) that are configured to be provided by the central processing subsystem, and identify a first subset of the devices that satisfy application provisioning requirements for the application(s). The device access control management subsystem then configures the device access controller subsystem to provide the central processing subsystem access to the first subset of the devices in order to allow the central processing subsystem to provide the application(s), and disable access for the central processing subsystem to a second subset of the devices in order to prevent the central processing subsystem from using the second subset of the devices to provide the application(s). Thus, devices and/or device functionality in a server may be configured for local and remote use in a manner that provide a more efficient use of those devices and/or that device functionality and/or more optimal provisioning of applications than conventional composable systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device access control system, comprising:
a first computing system including:
 a device access controller subsystem;
 a plurality of first devices that are coupled to the device access controller subsystem;
 a central processing subsystem that is coupled to the device access controller subsystem; and
 a device access control manager subsystem that is coupled to the device access controller subsystem, wherein the device access control manager subsystem includes at least one hardware processor that is configured, during initialization operations for the first computing system and prior to the provisioning of any operating system in the first computing system, to:
  identify at least one first application that is configured to be provided by the central processing subsystem;
  identify a first subset of the plurality of first devices that satisfy first application provisioning requirements for the at least one first application;
  configure the device access controller subsystem to provide the central processing subsystem access to the first subset of the plurality of first devices in order to allow the central processing subsystem to provide the at least one first application; and
  configure the device access controller subsystem to disable access for the central processing subsystem to a second subset of the plurality of first devices in order to prevent the central processing subsystem from using the second subset of the plurality of first devices to provide the at least one first application.

2. The system of claim 1, wherein the at least one hardware processor in the device access control manager subsystem is configured to:
 determine, during runtime operations for the first computing system, that the first application provisioning requirements for the at least one first application have changed;
 identify at least one of the second subset of the plurality of first devices that satisfies the first application provisioning requirements for the at least one first application that have changed; and
 configure the device access controller subsystem to provide the central processing subsystem access to the at least one of the second subset of the plurality of first devices in order to allow the central processing subsystem to provide the at least one first application.

3. The system of claim 1, wherein the configuring the device access controller subsystem to provide the central processing subsystem access to the first subset of the plurality of first devices includes:
 configuring the device access controller subsystem to provide the central processing subsystem access to first device functionality provided by at least one of the first subset of the plurality of first devices; and
 configuring the device access controller subsystem to prevent the central processing subsystem from accessing second device functionality provided by the at least one of the first subset of the plurality of first devices.

4. The system of claim 1, wherein the at least one hardware processor in the device access control manager subsystem is configured, during the initialization operations for the first computing system, to:
 configure the device access controller subsystem to provide the central processing subsystem access to at least one second device that is coupled to the first computing system via a network in order to allow the central processing subsystem to provide the at least one first application; and
 configure the device access controller subsystem to disable access for the central processing subsystem to at least one third device that is coupled to the first computing system via a network in order to prevent the central processing subsystem from using the at least one third device to provide the at least one first application.

5. The system of claim 1, wherein the device access controller subsystem includes a fabric switch device, and wherein the device access control manager subsystem includes a System Control Processor (SCP) subsystem.

6. The system of claim 1, wherein the at least one hardware processor in the device access control manager subsystem is configured, during the initialization operations for the first computing system, to:
 configure the device access controller subsystem to provide the central processing subsystem access to first central processing system functionality in order to allow the central processing subsystem to utilize the first central processing system functionality to provide the at least one first application; and
 configure the device access controller subsystem to prevent the central processing subsystem from accessing second central processing system functionality in order to prevent the central processing subsystem from utilizing the second central processing system functionality to provide the at least one first application.

7. An Information Handling System (IHS), comprising:
a secondary processing subsystem that includes at least one hardware processor; and
a secondary memory subsystem that is coupled to the secondary processing subsystem and that includes instructions that, when executed by the at least one hardware processor in the secondary processing subsystem, cause the at least one hardware processor in the secondary processing subsystem to provide a device access control manager engine that is configured, during initialization operations for a first computing system that includes the IHS and prior to the provisioning of any operating system in the first computing system, to:

identify at least one first application that is configured to be provided by a central processing subsystem that is included in a first computing system;

identify a first subset of a plurality of first devices in the first computing system that satisfy first application provisioning requirements for the at least one first application;

configure a device access controller subsystem in the first computing system to provide the central processing subsystem access to the first subset of the plurality of first devices in order to allow the central processing subsystem to provide the at least one first application; and configure the device access controller subsystem in the first computing system to disable access for the central processing subsystem to a second subset of the plurality of first devices in the first computing system in order to prevent the central processing subsystem from using the second subset of the plurality of first devices to provide the at least one first application.

8. The IHS of claim 7, wherein the at least one hardware processor in the device access control manager engine is configured to:

determine, during runtime operations for the first computing system, that the first application provisioning requirements for the at least one first application have changed;

identify at least one of the second subset of the plurality of first devices that satisfies the first application provisioning requirements for the at least one first application that have changed; and configure the device access controller subsystem in the first computing system to provide the central processing subsystem access to the at least one of the second subset of the plurality of first devices in order to allow the central processing subsystem to provide the at least one first application.

9. The IHS of claim 7, wherein the configuring the device access controller subsystem in the first computing system to provide the central processing subsystem access to the first subset of the plurality of first devices includes:

configuring the device access controller subsystem in the first computing system to provide the central processing subsystem access to first device functionality provided by at least one of the first subset of the plurality of first devices; and configuring the device access controller subsystem in the first computing system to prevent the central processing subsystem from accessing second device functionality provided by the at least one of the first subset of the plurality of first devices.

10. The IHS of claim 7, wherein the at least one hardware processor in the device access control manager engine is configured, during the initialization operations for the first computing system, to:

configure the device access controller subsystem in the first computing system to provide the central processing subsystem access to at least one second device that is coupled to the first computing system via a network in order to allow the central processing subsystem to provide the at least one first application; and configure the device access controller subsystem in the first computing system to disable access for the central processing subsystem to at least one third device that is coupled to the first computing system via a network in order to prevent the central processing subsystem from using the at least one third device to provide the at least one first application.

11. The IHS of claim 7, wherein the device access controller subsystem includes a fabric switch device.

12. The IHS of claim 7, wherein the device access control manager subsystem includes a System Control Processor (SCP) subsystem.

13. The IHS of claim 7, wherein the at least one hardware processor in the device access control manager engine is configured, during the initialization operations for the first computing system that includes the IHS, to:

configure the device access controller subsystem in the first computing system to provide the central processing subsystem access to first central processing system functionality in order to allow the central processing subsystem to utilize the first central processing system functionality to provide the at least one first application; and configure the device access controller subsystem in the first computing system to prevent the central processing subsystem from accessing second central processing system functionality in order to prevent the central processing subsystem from utilizing the second central processing system functionality to provide the at least one first application.

14. A method for providing device access control, comprising:

identifying, by at least one hardware processor in a device access control manager subsystem during initialization operations for a first computing system that includes the device access control manager subsystem and prior to the provisioning of any operating system in the first computing system, at least one first application that is configured to be provided by a central processing subsystem that is included in the first computing system;

identifying, by the at least one hardware processor in the device access control manager subsystem during the initialization operations for the first computing system and prior to the provisioning of any operating system in the first computing system, a first subset of a plurality of first devices in the first computing system that satisfy first application provisioning requirements for the at least one first application;

configuring, by the at least one hardware processor in the device access control manager subsystem during the initialization operations for the first computing system and prior to the provisioning of any operating system in the first computing system, a device access controller subsystem in the first computing system to provide the central processing subsystem access to the first subset of the plurality of first devices in order to allow the central processing subsystem to provide the at least one first application; and configuring, by the at least one hardware processor in the device access control manager subsystem during the initialization operations for the first computing system and prior to the provisioning of any operating system in the first computing system, the device access controller subsystem in the first computing system to disable access for the central processing subsystem to a second subset of the plurality of first devices in the first computing system in order to prevent the central processing subsystem from using the second subset of the plurality of first devices to provide the at least one first application.

15. The method of claim 14, further comprising:
determining, by the at least one hardware processor in the device access control manager subsystem during run-time operations for the first computing system, that the first application provisioning requirements for the at least one first application have changed;
identifying, by the at least one hardware processor in the device access control manager subsystem, at least one of the second subset of the plurality of first devices that satisfies the first application provisioning requirements for the at least one first application that have changed; and
configuring, by the at least one hardware processor in the device access control manager subsystem, the device access controller subsystem in the first computing system to provide the central processing subsystem access to the at least one of the second subset of the plurality of first devices in order to allow the central processing subsystem to provide the at least one first application.

16. The method of claim 14, wherein the configuring the device access controller subsystem in the first computing system to provide the central processing subsystem access to the first subset of the plurality of first devices includes:
configuring, by the at least one hardware processor in the device access control manager subsystem, the device access controller subsystem in the first computing system to provide the central processing subsystem access to first device functionality provided by at least one of the first subset of the plurality of first devices; and
configuring, by the at least one hardware processor in the device access control manager subsystem, the device access controller subsystem in the first computing system to prevent the central processing subsystem from accessing second device functionality provided by the at least one of the first subset of the plurality of first devices.

17. The method of claim 14, further comprising:
configuring, by the at least one hardware processor in the device access control manager subsystem during initialization operations for a first computing system, the device access controller subsystem in the first computing system to provide the central processing subsystem access to at least one second device that is coupled to the first computing system via a network in order to allow the central processing subsystem to provide the at least one first application; and
configuring, by the at least one hardware processor in the device access control manager subsystem during initialization operations for a first computing system, the device access controller subsystem in the first computing system to disable access for the central processing subsystem to at least one third device that is coupled to the first computing system via a network in order to prevent the central processing subsystem from using the at least one third device to provide the at least one first application.

18. The method of claim 14, wherein the device access controller subsystem includes a fabric switch device.

19. The method of claim 14, wherein the device access control manager subsystem includes a System Control Processor (SCP) subsystem.

20. The method of claim 14, further comprising:
configuring, by the at least one hardware processor in the device access control manager subsystem during the initialization operations for the first computing system, the device access controller subsystem in the first computing system to provide the central processing subsystem access to first central processing system functionality in order to allow the central processing subsystem to utilize the first central processing system functionality to provide the at least one first application; and
configuring, by the at least one hardware processor in the device access control manager subsystem during the initialization operations for the first computing system, the device access controller subsystem in the first computing system to prevent the central processing subsystem from accessing second central processing system functionality in order to prevent the central processing subsystem from utilizing the second central processing system functionality to provide the at least one first application.

* * * * *